United States Patent
Nakahara et al.

(10) Patent No.: US 7,642,011 B2
(45) Date of Patent: *Jan. 5, 2010

(54) SECONDARY BATTERY WITH A RADICAL COMPOUND ACTIVE MATERIAL

(75) Inventors: Kentaro Nakahara, Tokyo (JP); Masaharu Satoh, Tokyo (JP); Shigeyuki Iwasa, Tokyo (JP); Hiroshi Yageta, Tokyo (JP); Yutaka Bannai, Tokyo (JP); Yukiko Morioka, Tokyo (JP); Etsuo Hasegawa, Tokyo (JP)

(73) Assignee: NEC Corporation, Tokyo (JP)

( * ) Notice: Subject to any disclaimer, the term of this patent is extended or adjusted under 35 U.S.C. 154(b) by 971 days.

This patent is subject to a terminal disclaimer.

(21) Appl. No.: 11/065,365

(22) Filed: Feb. 25, 2005

(65) Prior Publication Data

US 2005/0170247 A1    Aug. 4, 2005

Related U.S. Application Data

(62) Division of application No. 09/789,585, filed on Feb. 22, 2001, now Pat. No. 6,866,964.

(30) Foreign Application Priority Data

| Feb. 25, 2000 | (JP) | 2000-049705 |
| Aug. 10, 2000 | (JP) | 2000-242806 |
| Sep. 4, 2000 | (JP) | 2000-266922 |
| Dec. 4, 2000 | (JP) | 2000-368475 |

(51) Int. Cl.
*H01M 4/02* (2006.01)
*H01M 4/58* (2006.01)

(52) U.S. Cl. ................................. 429/213; 429/218.1
(58) Field of Classification Search ................. 429/213, 429/218.1
See application file for complete search history.

(56) References Cited

U.S. PATENT DOCUMENTS

| 4,397,922 A | 8/1983 | Pokhodenko et al. |
| 4,547,439 A | 10/1985 | Genies |
| 4,904,553 A | 2/1990 | Nakajima et al. |
| 5,324,599 A | 6/1994 | Oyama et al. |

FOREIGN PATENT DOCUMENTS

| EP | 0 176 921 | 4/1986 |
| EP | 1 381 100 | 1/2004 |
| JP | 59-196570 | 11/1984 |

(Continued)

OTHER PUBLICATIONS

Miura, Y.: "Synthesis and properties of organic conjugated polyradicals", Magnetic Properties of Organic Materials (1999), pp. 267-284 (XP009033339).

(Continued)

*Primary Examiner*—Patrick Ryan
*Assistant Examiner*—Helen O Chu
(74) *Attorney, Agent, or Firm*—Young & Thompson

(57) ABSTRACT

A radical compound may be used as an active material for an anode layer 2 to provide a novel stable secondary battery with a higher energy density and a larger capacity. The radical compound used has, for example, a spin concentration of $10^{21}$ spins/g or more.

6 Claims, 2 Drawing Sheets

FOREIGN PATENT DOCUMENTS

| | | |
|---|---|---|
| JP | 2-638 | 1/1990 |
| JP | 7-19603 | 3/1995 |
| JP | 7-32018 | 4/1995 |
| JP | 08-306387 | 11/1996 |
| JP | 8-195199 | 7/1997 |
| JP | 9-241527 | 9/1997 |
| JP | 09-265989 | 10/1997 |
| JP | 9-326262 | 12/1997 |
| JP | 10-3924 | 1/1998 |
| JP | 2 715 778 | 2/1998 |
| JP | 10-106579 | 4/1998 |
| JP | 10-154531 | 6/1998 |
| JP | 10-162809 | 6/1998 |
| JP | 10-247518 | 9/1998 |
| JP | 11-40194 | 2/1999 |
| JP | 2000-268861 | 9/2000 |
| JP | 1202374 | 5/2002 |

OTHER PUBLICATIONS

Nishide, H. et al., "Pendant and n -conguated organic polyradicals" Magnetic Properties of Organic Materials (1999) pp. 285-303 (XP009033340).

Xie, C. et al., "Highly stabilized phenoxyl radicals with hydrogen-bonding capability", Tetrahedron Letters, Elsevier Science Publishers, Amsteram, NL., vol. 40, No. 23, pp. 4305-4308 (Jun. 6, 1999) (XP004164632).

Miura, Y. et al.: "A novel lipophilic spin probe for the measurement of radiation damage in mouse brain using in vivo electron spin resonance (ESR)", FEBS Letters, Elsevier Science Publishers, Amsterdam, NL, vol. 419, No. 1, Dec. 8, 1997, pp. 99-102, XP-004261598.

Kurosaki, T. et al.: "Polymers Having Stable Radicals. I. Synthesis of Nitroxyl Polymers from 4-Methacryloyl Derivatives of 2,2,6,6-Tetramethylpiperidine", 1972, Journal of Polymer Science, Interscience Publishers, pp. 3295-3310, XP-000892970.

Kozantzev, E.G. et al. : Free Iminoxyl Radicals in the Hydrogenated Pyrrole Series, Tetrahedron, vol. 21, 1965, pp. 491-497, XP-002287534.

Nakahara, K. et al.: Rechargeable batteries with organic radical cathodes, Chemical Physics Letters, Elsevier Science B.V., vol. 359, Jun. 27, 2002, pp. 351-354, XP-002287535.

Kinoshita et al., "Polyradikale mit Verdazyl-Gruppen", Die Makromolekulare Chemie, vol. 111, 1968, pp. 137-145, XP-002400637.

Koivisto et al., "The magnetochemistry of verdazyl radical-based materials", Coordination Chemistry Reviews, Elsevier Science, vol. 249, No. 23, Dec. 1, 2005, pp. 2612-2630, XP-005174063.

SECONDARY BATTERY WITH A RADICAL COMPOUND ACTIVE MATERIAL

This application is a division of co-pending application Ser. No. 09/789,585, filed on Feb. 22, 2001, the entire contents of which are hereby incorporated by reference.

BACKGROUND OF THE INVENTION

1. Field of the Invention

This invention relates to a stable secondary battery with a higher energy density and to an active material used therein.

2. Description of the Prior Art

As markets for a note-type personal computer and a mobile telephone have been rapidly expanded, there have been increased needs to a small and large-capacity secondary battery with a higher energy density used in these devices. To satisfy the needs, a secondary battery has been developed, which utilizes an electrochemical reaction associated with charge transfer on alkali-metal ions as a charge carrier such as lithium ions. Among others, a lithium-ion secondary battery has been used in a variety of electronic devices as a stable and large-capacity secondary battery with a higher energy density.

Such a lithium-ion secondary battery uses a transition-metal oxide containing lithium in a positive electrode (cathode) and carbon in a negative electrode (anode) as active materials, and performs charge and discharge utilizing insertion in and elimination from these active materials.

However, since the lithium-ion secondary battery uses a metal oxide with a large specific gravity particularly in a positive electrode, it has an insufficient secondary battery capacity per a unit weight. There have been, therefore, attempts for developing a large-capacity secondary battery using a lighter electrode material. For example, U.S. Pat. Nos. 4,833,048 and 2,715,778 have disclosed a secondary battery using an organic compound having a disulfide bond in a positive electrode, which utilizes, as a principle of a secondary battery, an electrochemical oxidation-reduction reaction associated with formation and dissociation of a disulfide bond. The secondary battery uses electrode materials comprising elements having a smaller specific gravity such as sulfur and carbon as main components. Although these materials are effective to some degree in providing a large-capacity secondary battery with a higher energy density, it has a small efficiency in reformation of a dissociated bond and exhibits insufficient stability in a charge or discharge condition.

Furthermore, there has been suggested a secondary battery also utilizing an organic compound, i.e., a secondary battery using a conductive polymer as an electrode material. It is a secondary battery whose principle is doping and undoping reactions of electrolyte ions on the conductive polymer. The doping reaction as used herein is a reaction of stabilizing excitons such as charged solitons and polarons generated by oxidation or reduction of a conductive polymer by counter ions. On the other hand, a undoping reaction as used herein refers to a reaction which is opposite to the above reaction and in which excitons stabilized by counter ions are electrochemically oxidized or reduced. U.S. Pat. No. 4,442,187 has disclosed a secondary battery using such a conductive polymer as a positive electrode or negative electrode material. The secondary battery is constituted with elements with a lower specific gravity such as carbon and nitrogen, and thus has been expected to be developed as a large-capacity secondary battery. A conductive polymer, however, has a property that excitons generated by oxidation or reduction are delocalized over a wide region of $\delta$-electron conjugated system and interacted with each other. It results in a limitation to a concentration of excitons generated, and therefore, to a capacity of a secondary battery. Thus, a secondary battery using a conductive polymer as an electrode material is effective to some degree in terms of weight reduction, but is not adequately effective in terms of increase in a capacity.

As described above, there have been various proposals for a secondary battery which does not use a transition-metal containing active material, in an attempt to achieve a large-capacity secondary battery. There have been, however, provided no stable secondary batteries with a higher energy density and a large capacity.

As described above, in a lithium-ion secondary battery using a transition metal oxide as a positive electrode, a specific gravity of the element is so high that it has been theoretically difficult to prepare a secondary battery with a larger capacity than that currently used. An objective of this invention is, therefore, to provide a novel stable secondary battery with a higher energy density and a larger capacity.

SUMMARY OF THE INVENTION

To solve the above problems, this invention provides:

[1] a secondary battery comprising at least a positive electrode, a negative electrode and an electrolyte, wherein an active material in at least one of the positive electrode and the negative electrode contains a radical compound;

[2] a secondary battery comprising at least a positive electrode, a negative electrode and an electrolyte, wherein an active material in at least one of the positive electrode and the negative electrode is a radical compound;

[3] a secondary battery comprising at least a positive electrode, a negative electrode and an electrolyte, wherein an active material in at least one of the positive electrode and the negative electrode consists of two or more materials, at least one of which is a radical compound;

[4] a secondary battery utilizing an electrode reaction of an active material, wherein the electrode reaction in at least one of the positive electrode and the negative electrode is that where a reactant or product is a radical compound; or

[5] a secondary battery utilizing an electrode reaction of an active material, wherein two or more electrode reactions occur in at least one of the positive electrode and the negative electrode and at least one of the reactions is that where a reactant or product is a radical compound.

In the present invention, a positive electrode means a cathode and a negative electrode means an anode.

In the above secondary battery, the active material may be a positive electrode active material.

In the above secondary battery, the electrode reaction may be that in the positive electrode.

In the above secondary battery, the electrode reaction in the positive electrode may be a discharge reaction in which the radical compound is a reactant.

In the above secondary battery, the electrode reaction in the positive electrode may be a discharge reaction in which the radical compound is a product.

In the above secondary battery, the discharge reaction may be that forming a bond between the radical compound and an electrolyte cation.

In the above secondary battery, the discharge reaction may be that cleaving a bond between the radical compound and an electrolyte anion.

In the above secondary battery, the electrolyte cation may be a lithium ion.

In the above secondary battery, the radical compound may have a spin concentration of $10^{21}$ spins/g or more.

In the above secondary battery, the radical compound may be a neutral radical compound.

In the above secondary battery, the radical compound may be a stable radical compound.

In the above secondary battery, examples of the radical compound include the followings:

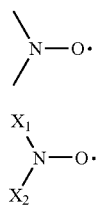

(A1)

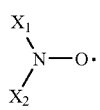

(A2)

wherein $X_1$ and $X_2$ are a substituent containing at least one of an aliphatic group, an aromatic group, hydroxy, alkoxy, aldehyde, carboxyl, alkoxycarbonyl, cyano, amino, nitro, nitroso, halogen or hydrogen, provided that when $X_1$ and $X_2$ contain an aliphatic group, the aliphatic group may be saturated or unsaturated, substituted or unsubstituted, and straight, cyclic or branched, and may contain at least one of oxygen, nitrogen, sulfur, silicon, phosphorous, boron and halogen atoms; when $X_1$ and $X_2$ contain an aromatic group, the aromatic group may be substituted or unsubstituted and may contain at least one of oxygen, nitrogen, sulfur, silicon, phosphorous, boron and halogen atoms; when $X_1$ and $X_2$ contain hydroxy, the hydroxy may form a salt with a metal atom; when $X_1$ and $X_2$ contain alkoxy, aldehyde, carboxyl, alkoxycarbonyl, cyano, amino, nitro or nitroso, these substituents may be substituted or unsubstituted and may contain at least one of oxygen, nitrogen, sulfur, silicone, phosphorous, boron and halogen atoms; $X_1$ and $X_2$ may be the same or different; and $X_1$ and $X_2$ taken together may form a ring;

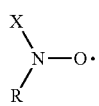

(A3)

wherein R is alkyl which may be substituted or unsubstituted, straight, cyclic or branched, and may contain at least one of oxygen, nitrogen, sulfur, silicon, phosphorous, boron and halogen atoms; X is a substituent containing at least one of an aliphatic group, an aromatic group, hydroxy, alkoxy, aldehyde, carboxyl, alkoxycarbonyl, cyano, amino, nitro, nitroso, halogen or hydrogen, provided that when X contains an aliphatic group, the aliphatic group may be saturated or unsaturated, substituted or unsubstituted, and straight, cyclic or branched, and may contain at least one of oxygen, nitrogen, sulfur, silicon, phosphorous, boron and halogen atoms; when X contains an aromatic group, the aromatic group may be substituted or unsubstituted and may contain at least one of oxygen, nitrogen, sulfur, silicon, phosphorous, boron and halogen atoms; when X contains hydroxy, the hydroxy may form a salt with a metal atom; when X contains alkoxy, aldehyde, carboxyl, alkoxycarbonyl, cyano, amino, nitro or nitroso, the substituent may be substituted or unsubstituted and may contain at least one of oxygen, nitrogen, sulfur, silicon, phosphorous, boron and halogen atoms; X may form a ring; and the alkyl R may be tert-butyl;

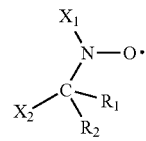

(A4)

wherein $R_1$ and $R_2$ are alkyl which may be substituted or unsubstituted, straight, cyclic or branched, and may contain at least one of oxygen, nitrogen, sulfur, silicon, phosphorous, boron and halogen atoms; $R_1$ and $R_2$ may be the same or different; $X_1$ and $X_2$ are a substituent containing at least one of an aliphatic group, an aromatic group, hydroxy, alkoxy, aldehyde, carboxyl, alkoxycarbonyl, cyano, amino, nitro, nitroso, halogen or hydrogen, provided that when $X_1$ and $X_2$ contain an aliphatic group, the aliphatic group may be saturated or unsaturated, substituted or unsubstituted, and straight, cyclic or branched, and may contain at least one of oxygen, nitrogen, sulfur, silicon, phosphorous, boron and halogen atoms; when $X_1$ and $X_2$ contain an aromatic group, the aromatic group may be substituted or unsubstituted and may contain at least one of oxygen, nitrogen, sulfur, silicon, phosphorous, boron and halogen atoms; when $X_1$ and $X_2$ contain hydroxy, the hydroxy may form a salt with a metal atom; when $X_1$ and $X_2$ contain alkoxy, aldehyde, carboxyl, alkoxycarbonyl, cyano, amino, nitro or nitroso, these substituents may be substituted or unsubstituted and may contain at least one of oxygen, nitrogen, sulfur, silicon, phosphorous, boron and halogen atoms; $X_1$ and $X_2$ may be the same or different; and $X_1$ and $X_2$ may form a ring; and both of the alkyls $R_1$ and $R_2$ may be methyl;

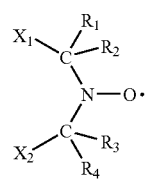

(A5)

wherein $R_1$ to $R_4$ are alkyl which may be substituted or unsubstituted, straight, cyclic or branched, and may contain at least one of oxygen, nitrogen, sulfur, silicon, phosphorous, boron and halogen atoms; $R_1$ to $R_4$ may be the same or different; $X_1$ and $X_2$ are a substituent containing at least one of an aliphatic group, an aromatic group, hydroxy, alkoxy, aldehyde, carboxyl, alkoxycarbonyl, cyano, amino, nitro, nitroso, halogen or hydrogen, provided that when $X_1$ and $X_2$ contain an aliphatic group, the aliphatic group may be saturated or unsaturated, substituted or unsubstituted, and straight, cyclic or branched, and may contain at least one of oxygen, nitrogen, sulfur, silicon, phosphorous, boron and halogen atoms; when $X_1$ and $X_2$ contain an aromatic group, the aromatic group may be substituted or unsubstituted and may contain at least one of oxygen, nitrogen, sulfur, silicon, phosphorous, boron and halogen atoms; when $X_1$ and $X_2$ contain hydroxy, the hydroxy may form a salt with a metal atom; when $X_1$ and $X_2$ contain alkoxy, aldehyde, carboxyl, alkoxycarbonyl, cyano, amino, nitro or nitroso, these substituents may be substituted or unsubstituted and may contain at least one of oxygen, nitrogen, sulfur, silicon, phosphorous, boron and halogen atoms;

$X_1$ and $X_2$ may be the same or different; and $X_1$ and $X_2$ may form a ring; and all of the alkyls $R_1$ to $R_4$ may be methyl.

The radical compound may be the nitroxyl radical compound represented by general formula (A6) where the nitrogen atom in the nitroxyl radical group is bound to at least one aryl:

(A6)

wherein Ar is aryl which may be substituted or unsubstituted and may contain at least one of oxygen, nitrogen, sulfur, silicon, phosphorous, boron and halogen atoms; X is a substituent containing at least one of an aliphatic group, an aromatic group, hydroxy, alkoxy, aldehyde, carboxyl, alkoxycarbonyl, cyano, amino, nitro, nitroso, halogen or hydrogen, provided that when X contains an aliphatic group, the aliphatic group may be saturated or unsaturated, substituted or unsubstituted, and straight, cyclic or branched, and may contain at least one of oxygen, nitrogen, sulfur, silicon, phosphorous, boron and halogen atoms; when X contains an aromatic group, the aromatic group may be substituted or unsubstituted and may contain at least one of oxygen, nitrogen, sulfur, silicon, phosphorous, boron and halogen atoms; when X contains hydroxy, the hydroxy may form a salt with a metal atom; when X contains alkoxy, aldehyde, carboxyl, alkoxycarbonyl, cyano, amino, nitro or nitroso, the substituent may be substituted or unsubstituted and may contain at least one of oxygen, nitrogen, sulfur, silicon, phosphorous, boron and halogen atoms; X may form a ring; and the aryl may be substituted or unsubstituted phenyl.

The radical compound may be the compound forming substituted or unsubstituted heterocycle, represented by general formula (A7):

(A7)

wherein X is carbon, oxygen, nitrogen, sulfur, silicon, phosphorous or boron atom, provided that X may be the same or different; X may be bound via saturated or unsaturated bonds; X may form a bond with any substituent; this compound may be a polymer which may be straight, cyclic or branched; and n is an integer of 2 to 10 both inclusive.

The above radical compound may be the nitroxyl radical compound having a piperidinoxyl ring structure, represented by general formula (A8):

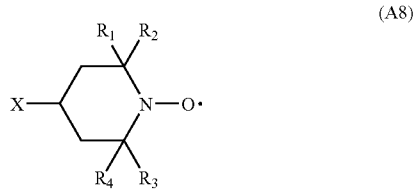
(A8)

where $R_1$ to $R_4$ are alkyl which may be substituted or unsubstituted, straight, cyclic or branched, and may contain at least one of oxygen, nitrogen, sulfur, silicon, phosphorous, boron and halogen atoms; X is a substituent containing at least one of an aliphatic group, an aromatic group, hydroxy, alkoxy, aldehyde, carboxyl, alkoxycarbonyl, cyano, amino, nitro, nitroso, halogen or hydrogen, provided that when X contains an aliphatic group, the aliphatic group may be saturated or unsaturated, substituted or unsubstituted, and straight, cyclic or branched, and may contain at least one of oxygen, nitrogen, sulfur, silicon, phosphorous, boron and halogen atoms; when X contains an aromatic group, the aromatic group may be substituted or unsubstituted and may contain at least one of oxygen, nitrogen, sulfur, silicon, phosphorous, boron and halogen atoms; when X contains hydroxy, the hydroxy may form a salt with a metal atom; when X contains alkoxy, aldehyde, carboxyl, alkoxycarbonyl, cyano, amino, nitro or nitroso, the substituent may be substituted or unsubstituted and may contain at least one of oxygen, nitrogen, sulfur, silicon, phosphorous, boron and halogen atoms; and X may form a ring.

The above radical compound may be the nitroxyl radical compound having a pyrrolidinoxyl ring structure represented by general formula (A9):

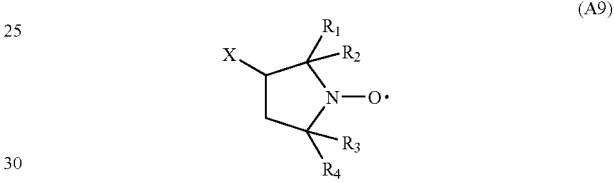
(A9)

where $R_1$ to $R_4$ are alkyl which may be substituted or unsubstituted, straight, cyclic or branched, and may contain at least one of oxygen, nitrogen, sulfur, silicon, phosphorous, boron and halogen atoms; X is a substituent containing at least one of an aliphatic group, an aromatic group, hydroxy, alkoxy, aldehyde, carboxyl, alkoxycarbonyl, cyano, amino, nitro, nitroso, halogen or hydrogen, provided that when X contains an aliphatic group, the aliphatic group may be saturated or unsaturated, substituted or unsubstituted, and straight, cyclic or branched, and may contain at least one of oxygen, nitrogen, sulfur, silicon, phosphorous, boron and halogen atoms; when X contains an aromatic group, the aromatic group may be substituted or unsubstituted and may contain at least one of oxygen, nitrogen, sulfur, silicon, phosphorous, boron and halogen atoms; when X contains hydroxy, the hydroxy may form a salt with a metal atom; when X contains alkoxy, aldehyde, carboxyl, alkoxycarbonyl, cyano, amino, nitro or nitroso, the substituent may be substituted or unsubstituted and may contain at least one of oxygen, nitrogen, sulfur, silicon, phosphorous, boron and halogen atoms; and X may form a ring.

The above radical compound may be the nitroxyl radical compound having a pyrrolinoxyl ring structure represented by general formula (A10):

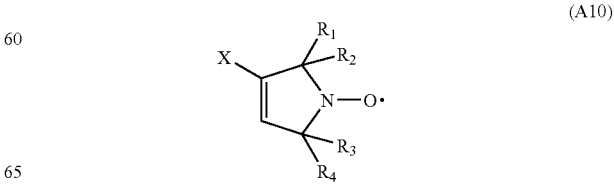
(A10)

where $R_1$ to $R_4$ are alkyl which may be substituted or unsubstituted, straight, cyclic or branched, and may contain at least one of oxygen, nitrogen, sulfur, silicon, phosphorous, boron and halogen atoms; X is a substituent containing at least one of an aliphatic group, an aromatic group, hydroxy, alkoxy, aldehyde, carboxyl, alkoxycarbonyl, cyano, amino, nitro, nitroso, halogen or hydrogen, provided that when X contains an aliphatic group, the aliphatic group may be saturated or unsaturated, substituted or unsubstituted, and straight, cyclic or branched, and may contain at least one of oxygen, nitrogen, sulfur, silicon, phosphorous, boron and halogen atoms; when X contains an aromatic group, the aromatic group may be substituted or unsubstituted and may contain at least one of oxygen, nitrogen, sulfur, silicon, phosphorous, boron and halogen atoms; when X contains hydroxy, the hydroxy may form a salt with a metal atom; when X contains alkoxy, aldehyde, carboxyl, alkoxycarbonyl, cyano, amino, nitro or nitroso, the substituent may be substituted or unsubstituted and may contain at least one of oxygen, nitrogen, sulfur, silicon, phosphorous, boron and halogen atoms; and X may form a ring.

The above radical compound may be the nitronylnitroxide compound represented by general formula (A11):

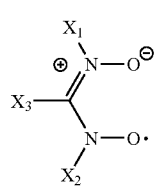

(A11)

where $X_1$ to $X_3$ are a substituent containing at least one of an aliphatic group, an aromatic group, hydroxy, alkoxy, aldehyde, carboxyl, alkoxycarbonyl, cyano, amino, nitro, nitroso, halogen or hydrogen, provided that when $X_1$ to $X_3$ contain an aliphatic group, the aliphatic group may be saturated or unsaturated, substituted or unsubstituted, and straight, cyclic or branched, and may contain at least one of oxygen, nitrogen, sulfur, silicon, phosphorous, boron and halogen atoms; when $X_1$ to $X_3$ contain an aromatic group, the aromatic group may be substituted or unsubstituted and may contain at least one of oxygen, nitrogen, sulfur, silicon, phosphorous, boron and halogen atoms; when $X_1$ to $X_3$ contain hydroxy, the hydroxy may form a salt with a metal atom; when $X_1$ to $X_3$ contain alkoxy, aldehyde, carboxyl, alkoxycarbonyl, cyano, amino, nitro or nitroso, these substituents may be substituted or unsubstituted and may contain at least one of oxygen, nitrogen, sulfur, silicon, phosphorous, boron and halogen atoms; $X_1$ to $X_3$ may be the same or different; and $X_1$ to $X_3$ may form a ring.

In the above secondary battery, the radical compound may be a polymer.

The polymer may be, for example, a polymer having a polyacetylene or polyphenylene-vinylene chain as a main chain.

In the above secondary battery, the radical compound may comprise an oxy radical compound.

The oxy radical compound may be, for example, an aryloxy radical compound.

Examples of the aryloxy radical compound may include those having an arylpolyoxy radical group, a tert-butyl group or a di-tert-butylphenoxy radical group.

In the above secondary battery, the oxy radical compound may be that containing a semi-quinone.

In the above secondary battery, the oxy radical compound may be a compound which is poorly soluble in a basic solvent.

In the above secondary battery, the oxy radical compound may be a polymer radical compound.

Examples of the polymer radical compound may include compounds having a polyolefin, polyacetylene or polyphenylene structure. In particular, preferably used polymers may be those having a five-membered aromatic heterocyclic structure and polymer compounds having a three-dimensional network structure.

In the secondary battery, the radical compound may comprise a compound having a radical on a nitrogen atom.

In the secondary battery, the radical compound may comprise a compound having a radical on a nitrogen atom in an oxidized form.

In the secondary battery, the radical compound may comprise a compound having a radical on a nitrogen atom in a reduced form.

Examples of the compound having a radical on a nitrogen atom may include:

a compound having a radical on a trivalent pherdazyl group represented by chemical formula (C1) or a tetravalent pherdazyl group represented by chemical formula C(2);

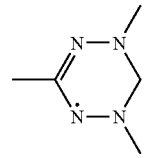

(C1)

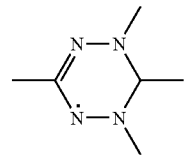

(C2)

a compound having a triphenylpherdazyl group represented by chemical formula (C3) or (C4);

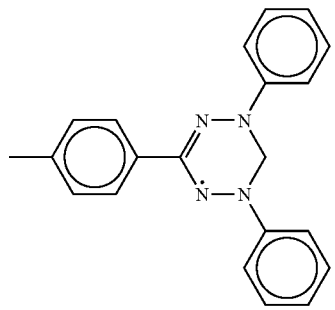

(C3)

-continued

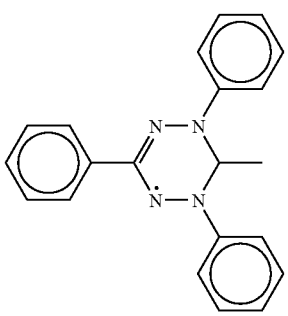
(C4)

a compound having a radical on a trivalent hydrazyl group represented by chemical formula (C5);

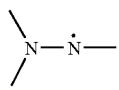
(C5)

a compound having a radical on a trivalent hydrazyl group represented by chemical formula (C6);

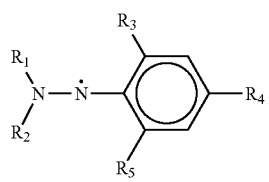
(C6)

where $R_1$ to $R_5$ independently represent hydrogen, substituted or unsubstituted aliphatic or aromatic hydrocarbon, halogen, hydroxy, nitro, nitroso, cyano, alkoxy, aryloxy, alkoxycarbonyl, aryloxycarbonyl, acyl or carboxy.

A compound having a radical on a nitrogen atom may be diphenylpicrylhydrazyl.

A compound having a radical on a nitrogen atom may be a compound having an aminotriazine structure represented by general formula (C7):

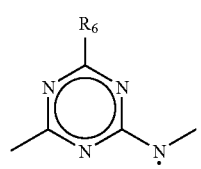
(C7)

where $R_6$ represents hydrogen, substituted or unsubstituted aliphatic or aromatic hydrocarbon, halogen, hydroxy, nitro, nitroso, cyano, alkoxy, aryloxy, alkoxycarbonyl, aryloxycarbonyl, acyl, carboxy or oxo radical.

The compound having a radical on a nitrogen atom may be a polymer. For example, it may be a polymer having the aminotriazine structure represented by general formula (C7) as a repeating unit.

This invention also provides the following active materials for a secondary battery:

[1] an active material for a secondary battery comprising a radical compound;

[2] an active material for a secondary battery involved in an electrode reaction in the secondary battery, wherein a reactant or product from the active material in the electrode reaction is a radical compound.

In the above secondary battery, a spin concentration of the radical compound is $10^{21}$ spins/g or more.

The active material for a secondary battery may be used in a positive electrode in the secondary battery.

In the above active material for a secondary battery, the radical compound may contain a nitroxyl radical compound having the functional group represented by chemical formula (A1).

(A1)

In the above active material for a secondary battery, the radical compound may contain the nitroxyl radical compound represented by general formula (A2):

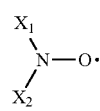
(A2)

wherein $X_1$ and $X_2$ are a substituent containing at least one of an aliphatic group, an aromatic group, hydroxy, alkoxy, aldehyde, carboxyl, alkoxycarbonyl, cyano, amino, nitro, nitroso, halogen or hydrogen, provided that when $X_1$ and $X_2$ contain an aliphatic group, the aliphatic group may be saturated or unsaturated, substituted or unsubstituted, and straight, cyclic or branched, and may contain at least one of oxygen, nitrogen, sulfur, silicon, phosphorous, boron and halogen atoms; when $X_1$ and $X_2$ contain an aromatic group, the aromatic group may be substituted or unsubstituted and may contain at least one of oxygen, nitrogen, sulfur, silicon, phosphorous, boron and halogen atoms; when $X_1$ and $X_2$ contain hydroxy, the hydroxy may form a salt with a metal atom; when $X_1$ and $X_2$ contain alkoxy, aldehyde, carboxyl, alkoxycarbonyl, cyano, amino, nitro or nitroso, these substituents may be substituted or unsubstituted and may contain at least one of oxygen, nitrogen, sulfur, silicone, phosphorous, boron and halogen atoms; $X_1$ and $X_2$ may be the same or different; and $X_1$ and $X_2$ taken together may form a ring.

In the above active material for a secondary battery, the radical compound may be the nitroxyl radical compound in which a nitrogen atom in the nitroxyl radical is bound to at least one alkyl, represented by general formula (A3):

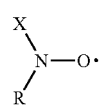
(A3)

wherein R is alkyl which may be substituted or unsubstituted, straight, cyclic or branched, and may contain at least one of oxygen, nitrogen, sulfur, silicon, phosphorous, boron and halogen atoms; X is a substituent containing at least one of an aliphatic group, an aromatic group, hydroxy, alkoxy, aldehyde, carboxyl, alkoxycarbonyl, cyano, amino, nitro, nitroso, halogen or hydrogen, provided that when X contains an aliphatic group, the aliphatic group may be saturated or unsaturated, substituted or unsubstituted, and straight, cyclic or branched, and may contain at least one of oxygen, nitrogen, sulfur, silicon, phosphorous, boron and halogen atoms; when X contains an aromatic group, the aromatic group may be substituted or unsubstituted and may contain at least one of oxygen, nitrogen, sulfur, silicon, phosphorous, boron and halogen atoms; when X contains hydroxy, the hydroxy may form a salt with a metal atom; when X contains alkoxy, aldehyde, carboxyl, alkoxycarbonyl, cyano, amino, nitro or nitroso, the substituent may be substituted or unsubstituted and may contain at least one of oxygen, nitrogen, sulfur, silicon, phosphorous, boron and halogen atoms; and X may form a ring.

In the above active material for a secondary battery, the alkyl group may be tert-butyl;

In the above active material for a secondary battery, the radical compound may be the nitroxyl radical compound in which a nitrogen atom in the nitroxyl radical is bound to at least two alkyls, represented by general formula (A4):

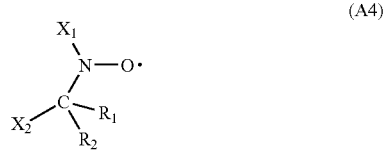

(A4)

wherein $R_1$ and $R_2$ are alkyl which may be substituted or unsubstituted, straight, cyclic or branched, and may contain at least one of oxygen, nitrogen, sulfur, silicon, phosphorous, boron and halogen atoms; $R_1$ and $R_2$ may be the same or different; $X_1$ and $X_2$ are a substituent containing at least one of an aliphatic group, an aromatic group, hydroxy, alkoxy, aldehyde, carboxyl, alkoxycarbonyl, cyano, amino, nitro, nitroso, halogen or hydrogen, provided that when $X_1$ and $X_2$ contain an aliphatic group, the aliphatic group may be saturated or unsaturated, substituted or unsubstituted, and straight, cyclic or branched, and may contain at least one of oxygen, nitrogen, sulfur, silicon, phosphorous, boron and halogen atoms; when $X_1$ and $X_2$ contain an aromatic group, the aromatic group may be substituted or unsubstituted and may contain at least one of oxygen, nitrogen, sulfur, silicon, phosphorous, boron and halogen atoms; when $X_1$ and $X_2$ contain hydroxy, the hydroxy may form a salt with a metal atom; when $X_1$ and $X_2$ contain alkoxy, aldehyde, carboxyl, alkoxycarbonyl, cyano, amino, nitro or nitroso, these substituents may be substituted or unsubstituted and may contain at least one of oxygen, nitrogen, sulfur, silicon, phosphorous, boron and halogen atoms; $X_1$ and $X_2$ may be the same or different; and $X_1$ and $X_2$ may form a ring.

In the above active material for a secondary battery, both of the alkyls $R_1$ and $R_2$ may be methyl.

In the above active material for a secondary battery, the radical compound may be the nitroxyl radical compound in which a nitrogen atom in the nitroxyl radical is bound to two carbon atoms bound to at least two alkyls, represented by general formula (A5):

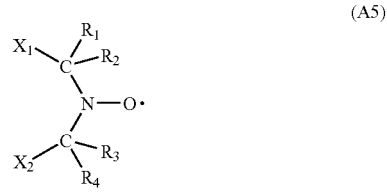

(A5)

wherein $R_1$ to $R_4$ are alkyl which may be substituted or unsubstituted, straight, cyclic or branched, and may contain at least one of oxygen, nitrogen, sulfur, silicon, phosphorous, boron and halogen atoms; $R_1$ to $R_4$ may be the same or different; $X_1$ and $X_2$ are a substituent containing at least one of an aliphatic group, an aromatic group, hydroxy, alkoxy, aldehyde, carboxyl, alkoxycarbonyl, cyano, amino, nitro, nitroso, halogen or hydrogen, provided that when $X_1$ and $X_2$ contain an aliphatic group, the aliphatic group may be saturated or unsaturated, substituted or unsubstituted, and straight, cyclic or branched, and may contain at least one of oxygen, nitrogen, sulfur, silicon, phosphorous, boron and halogen atoms; when $X_1$ and $X_2$ contain an aromatic group, the aromatic group may be substituted or unsubstituted and may contain at least one of oxygen, nitrogen, sulfur, silicon, phosphorous, boron and halogen atoms; when $X_1$ and $X_2$ contain hydroxy, the hydroxy may form a salt with a metal atom; when $X_1$ and $X_2$ contain alkoxy, aldehyde, carboxyl, alkoxycarbonyl, cyano, amino, nitro or nitroso, these substituents may be substituted or unsubstituted and may contain at least one of oxygen, nitrogen, sulfur, silicon, phosphorous, boron and halogen atoms; $X_1$ and $X_2$ may be the same or different; and $X_1$ and $X_2$ may form a ring.

In the above active material for a secondary battery, all of the alkyls $R_1$ to $R_4$ may be methyl.

In the above active material for a secondary battery, the radical compound may be the nitroxyl radical compound in which a nitrogen atom in the nitroxyl radical is bound to at least one aryl, represented by general formula (A6):

(A6)

wherein Ar is aryl which may be substituted or unsubstituted and may contain at least one of oxygen, nitrogen, sulfur, silicon, phosphorous, boron and halogen atoms; X is a substituent containing at least one of an aliphatic group, an aromatic group, hydroxy, alkoxy, aldehyde, carboxyl, alkoxycarbonyl, cyano, amino, nitro, nitroso, halogen or hydrogen, provided that when X contains an aliphatic group, the aliphatic group may be saturated or unsaturated, substituted or unsubstituted, and straight, cyclic or branched, and may contain at least one of oxygen, nitrogen, sulfur, silicon, phosphorous, boron and halogen atoms; when X contains an aromatic group, the aromatic group may be substituted or unsubstituted and may contain at least one of oxygen, nitrogen, sulfur, silicon, phosphorous, boron and halogen atoms; when X contains hydroxy, the hydroxy may form a salt with a metal atom; when X contains alkoxy, aldehyde, carboxyl, alkoxycarbonyl, cyano, amino, nitro or nitroso, the substituent may be substituted or unsubstituted and may contain at least one of oxygen, nitrogen, sulfur, silicon, phosphorous, boron and halogen atoms; and X may form a ring.

In the above active material for a secondary battery, the aryl may be substituted or unsubstituted phenyl.

In the above active material for a secondary battery, the radical compound may form the substituted or unsubstituted heterocycle represented by general formula (A7):

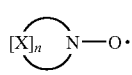

(A7)

wherein X is carbon, oxygen, nitrogen, sulfur, silicon, phosphorous or boron atom, provided that X may be the same or different; X may be bound via saturated or unsaturated bonds; X may form a bond with any substituent; this compound may be a polymer which may be straight, cyclic or branched; and n is an integer of 2 to 10 both inclusive.

In the above active material for a secondary battery, the nitroxyl radical compound may be that having a piperidinoxyl ring structure represented by general formula (A8):

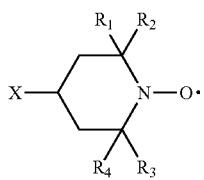

(A8)

where $R_1$ to $R_4$ are alkyl which may be substituted or unsubstituted, straight, cyclic or branched, and may contain at least one of oxygen, nitrogen, sulfur, silicon, phosphorous, boron and halogen atoms; X is a substituent containing at least one of an aliphatic group, an aromatic group, hydroxy, alkoxy, aldehyde, carboxyl, alkoxycarbonyl, cyano, amino, nitro, nitroso, halogen or hydrogen, provided that when X contains an aliphatic group, the aliphatic group may be saturated or unsaturated, substituted or unsubstituted, and straight, cyclic or branched, and may contain at least one of oxygen, nitrogen, sulfur, silicon, phosphorous, boron and halogen atoms; when X contains an aromatic group, the aromatic group may be substituted or unsubstituted and may contain at least one of oxygen, nitrogen, sulfur, silicon, phosphorous, boron and halogen atoms; when X contains hydroxy, the hydroxy may form a salt with a metal atom; when X contains alkoxy, aldehyde, carboxyl, alkoxycarbonyl, cyano, amino, nitro or nitroso, the substituent may be substituted or unsubstituted and may contain at least one of oxygen, nitrogen, sulfur, silicon, phosphorous, boron and halogen atoms; and X may form a ring.

In the above active material for a secondary battery, the nitroxyl radical compound may be that having a pyrrolidinoxyl ring structure represented by general formula (A9):

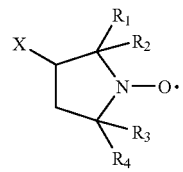

(A9)

where $R_1$ to $R_4$ are alkyl which may be substituted or unsubstituted, straight, cyclic or branched, and may contain at least one of oxygen, nitrogen, sulfur, silicon, phosphorous, boron and halogen atoms; X is a substituent containing at least one of an aliphatic group, an aromatic group, hydroxy, alkoxy, aldehyde, carboxyl, alkoxycarbonyl, cyano, amino, nitro, nitroso, halogen or hydrogen, provided that when X contains an aliphatic group, the aliphatic group may be saturated or unsaturated, substituted or unsubstituted, and straight, cyclic or branched, and may contain at least one of oxygen, nitrogen, sulfur, silicon, phosphorous, boron and halogen atoms; when X contains an aromatic group, the aromatic group may be substituted or unsubstituted and may contain at least one of oxygen, nitrogen, sulfur, silicon, phosphorous, boron and halogen atoms; when X contains hydroxy, the hydroxy may form a salt with a metal atom; when X contains alkoxy, aldehyde, carboxyl, alkoxycarbonyl, cyano, amino, nitro or nitroso, the substituent may be substituted or unsubstituted and may contain at least one of oxygen, nitrogen, sulfur, silicon, phosphorous, boron and halogen atoms; and X may form a ring.

In the above active material for a secondary battery, the nitroxyl radical compound may be that having a pyrrolinoxyl ring structure represented by general formula (A10):

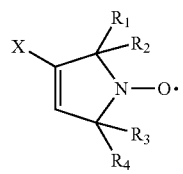

(A10)

where $R_1$ to $R_4$ are alkyl which may be substituted or unsubstituted, straight, cyclic or branched, and may contain at least one of oxygen, nitrogen, sulfur, silicon, phosphorous, boron and halogen atoms; X is a substituent containing at least one of an aliphatic group, an aromatic group, hydroxy, alkoxy, aldehyde, carboxyl, alkoxycarbonyl, cyano, amino, nitro, nitroso, halogen or hydrogen, provided that when X contains an aliphatic group, the aliphatic group may be saturated or unsaturated, substituted or unsubstituted, and straight, cyclic or branched, and may contain at least one of oxygen, nitrogen, sulfur, silicon, phosphorous, boron and halogen atoms; when X contains an aromatic group, the aromatic group may be substituted or unsubstituted and may contain at least one of oxygen, nitrogen, sulfur, silicon, phosphorous, boron and halogen atoms; when X contains hydroxy, the hydroxy may form a salt with a metal atom; when X contains alkoxy, aldehyde, carboxyl, alkoxycarbonyl, cyano, amino, nitro or nitroso, the substituent may be substituted or unsubstituted and may contain at least one of oxygen, nitrogen, sulfur, silicon, phosphorous, boron and halogen atoms; and X may form a ring.

In the above active material for a secondary battery, the radical compound may be a compound forming a nitronylnitroxide structure, represented by general formula (A11):

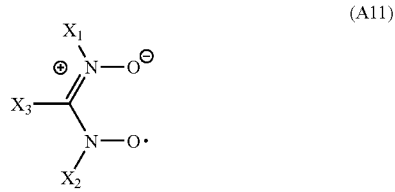

(A11)

where $X_1$ to $X_3$ are a substituent containing at least one of an aliphatic group, an aromatic group, hydroxy, alkoxy, aldehyde, carboxyl, alkoxycarbonyl, cyano, amino, nitro, nitroso, halogen or hydrogen, provided that when $X_1$ to $X_3$ contain an aliphatic group, the aliphatic group may be saturated or unsaturated, substituted or unsubstituted, and straight, cyclic or branched, and may contain at least one of oxygen, nitrogen, sulfur, silicon, phosphorous, boron and halogen atoms; when $X_1$ to $X_3$ contain an aromatic group, the aromatic group may be substituted or unsubstituted and may contain at least one of oxygen, nitrogen, sulfur, silicon, phosphorous, boron and halogen atoms; when $X_1$ to $X_3$ contain hydroxy, the hydroxy may form a salt with a metal atom; when $X_1$ to $X_3$ contain alkoxy, aldehyde, carboxyl, alkoxycarbonyl, cyano, amino, nitro or nitroso, these substituents may be substituted or unsubstituted and may contain at least one of oxygen, nitrogen, sulfur, silicon, phosphorous, boron and halogen atoms; $X_1$ to $X_3$ may be the same or different; and $X_1$ to $X_3$ may form a ring.

In the above active material for a secondary battery, the nitroxyl radical compound may be a polymer compound.

In the above active material for a secondary battery, the polymer compound may be that having a polyacetylene chain as a main chain.

In the above active material for a secondary battery, the polymer compound may be that having a polyphenylene-vinylene chain as a main chain.

In the above active material for a secondary battery, the radical compound may comprise an oxy radical compound.

In the above active material for a secondary battery, the oxy radical compound may be an aryloxy radical compound.

In the above active material for a secondary battery, the aryloxy radical compound may comprise arylpolyoxy radical group.

In the above active material for a secondary battery, the aryloxy radical compound may comprise a tert-butyl group.

In the above active material for a secondary battery, the aryloxy radical compound may comprise a di-tert-butylphenoxy radical group.

In the above active material for a secondary battery, the oxy radical compound may be that containing a semi-quinone.

In the above active material for a secondary battery, the oxy radical compound may be a compound which is poorly soluble in a basic solvent.

In the above active material for a secondary battery, the oxy radical compound may be a polymer radical compound.

In the above active material for a secondary battery, the polymer radical compound may be that having a polyolefin structure.

In the above active material for a secondary battery, the polymer radical compound may be that having a polyacetylene structure.

In the above active material for a secondary battery, the polymer radical compound may be that having a polyphenylene structure.

In the above active material for a secondary battery, the polymer radical compound may be that having a five-membered aromatic heterocyclic structure.

In the above active material for a secondary battery, the polymer radical compound may be that having a three-dimensional network structure.

In the above secondary battery, the radical compound may comprise a compound having a radical on a nitrogen atom.

In the above active material for a secondary battery, the radical compound may comprise a compound having a radical on a nitrogen atom in an oxidized form.

In the above active material for a secondary battery, the radical compound may comprise a compound having a radical on a nitrogen atom in a reduced form.

In the above active material for a secondary battery, the compound having a radical on a nitrogen atom may be that having a radical on a trivalent pherdazyl group represented by chemical formula (C1) or a tetravalent pherdazyl group represented by chemical formula C(2):

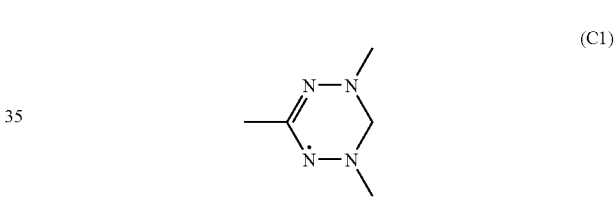

(C1)

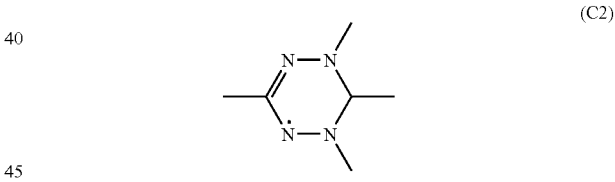

(C2)

In the above active material for a secondary battery, the compound having a radical on a nitrogen atom may be that having a triphenylpherdazyl group represented by chemical formula (C3) or (C4);

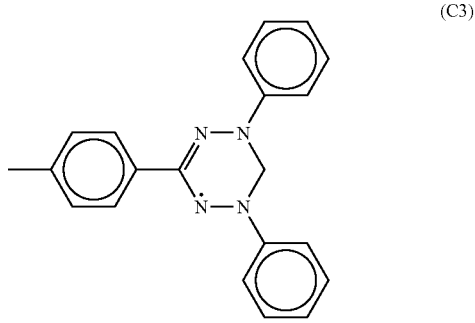

(C3)

-continued

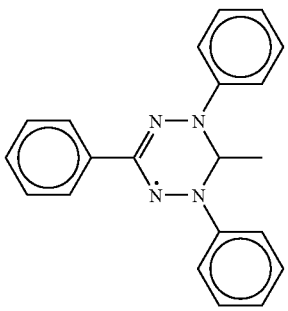
(C4)

In the above active material for a secondary battery, the compound having a radical on a nitrogen atom may be that having a radical on a trivalent hydrazyl group represented by chemical formula (C5):

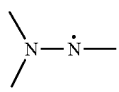
(C5)

In the above active material for a secondary battery, the compound having a radical on a nitrogen atom may be that having a radical on a trivalent hydrazyl group represented by chemical formula (C6):

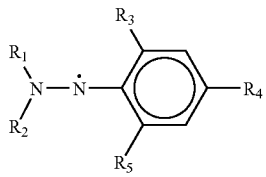
(C6)

where $R_1$ to $R_5$ independently represent hydrogen, substituted or unsubstituted aliphatic or aromatic hydrocarbon, halogen, hydroxy, nitro, nitroso, cyano, alkoxy, aryloxy, alkoxycarbonyl, aryloxycarbonyl, acyl or carboxy.

In the above active material for a secondary battery, the compound having a radical on a nitrogen atom may be diphenylpicrylhydrazyl.

In the above active material for a secondary battery, the compound having a radical on a nitrogen atom may be that having an aminotriazine structure represented by general formula (C7):

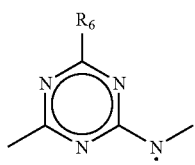
(C7)

where $R_6$ represents hydrogen, substituted or unsubstituted aliphatic or aromatic hydrocarbon, halogen, hydroxy, nitro, nitroso, cyano, alkoxy, aryloxy, alkoxycarbonyl, aryloxycarbonyl, acyl, carboxy or oxo radical.

In the above active material for a secondary battery, the compound having a radical on a nitrogen atom may be a polymer compound.

In the above active material for a secondary battery, the compound having an aminotriazine structure may be a polymer compound having the aminotriazine structure represented by general formula (C7) as a repeating unit.

This invention provides a secondary battery on the basis of a novel mechanism that a radical compound is used as an electrode active material. When the radical compound consists of lighter materials such as carbon, hydrogen and oxygen, it may be expected to provide a secondary battery with a high energy density per a weight. Furthermore, since only a radical site contributes a reaction in a secondary battery, this invention may provide a stable secondary battery whose cycle properties are independent of diffusion of the active material. In addition, since a reactive unpaired electron is localized on a radical atom in a radical compound, a concentration of the reactive site may be increased to provide a large-capacity secondary battery. This invention may be suitably applied to a secondary battery or active material for a secondary battery which performs charge and discharge.

An electrode active material as used herein refers to a material directly contributing to an electrode reaction such as charge and discharge reactions, and plays a main role in a secondary battery system. An active material in this invention may be used as either a positive electrode or negative electrode active material, but it may be more preferably used as a positive electrode active material because it is characterized by a light weight and has a good energy density in comparison with a metal oxide system.

In the light of stability, it is preferable that among electrode reactions in a positive electrode, an electrode reaction during discharge is that in which a radical compound is a reactant. Furthermore, when the reaction is that in which a reaction product may form a bond with an electrolyte cation, much more improvement in stability may be expected. Any type of electrolyte cations may be used, and in particular, a lithium ion is preferable in the light of a capacity.

As used herein, a reactant refers to a substance which is subject to a chemical reaction and stably exists for a long time, while a product refers to a substance formed as a result of a chemical reaction which stable exists for a long time. In this invention, a reactant or product is a radical compound. This invention, therefore, does not encompass a system in which a radical is formed for a quite short time as a reaction intermediate in the course of an electrode reaction.

According to a statistical mechanical theory, any chemical substance would contain radical-form species at room temperature. In this invention, it is, however, important that radicals exist to an extent where they may function as an active material in a secondary battery. For example, U.S. Pat. No. 2,715,778 has indicated organic compounds such as polyaniline, polypyrrole, polythiophene and a disulfide as an electrode active material, whose radical concentration is about $10^{18}$ spin/g.

In contrast, a concentration of a radical compound in this invention is preferably kept to $10^{19}$ spin/g or more, more preferably $10^{21}$ spin/g or more, in the light of a capacity in a secondary battery.

In general, a radical concentration may be expressed as a spin concentration. That is, a spin concentration means the number of unpaired electrons (radicals) per a unit weight, which is determined by, for example, the following procedure from an absorption area intensity in an electron spin resonance spectrum (hereinafter, referred to as an "ESR" spectrum). First, a sample to be measured by ESR spectroscopy is pulverized by grinding it in, for example, a mortar, whereby the sample may be ground to a particle size in which skin effect, i.e., a phenomenon that microwave does not penetrate a sample, can be ignored. A given amount of the pulverized sample is filled in a quartz glass capillary with an inner diameter of 2 mm or less, preferably 1 to 0.5 mm, vacuumed to 10-5 mmHg or less, sealed and subject to ESR spectroscopy. ESR spectroscopy may be conducted using an apparatus such as Model JEOL-JES-FR30 ESR spectrometer. A spin concentration may be determined by integrating twice an ESR signal obtained and comparing it to a calibration curve. There are no restrictions to a spectrometer or measuring conditions as long as a spin concentration can be accurately determined. As described above, a spin concentration for a radical compound may be evaluated by, for example, electron spin resonance spectroscopy. A charge state in a radical compound is preferably neutral in the light of easy charge/discharge reactions. For stability of a secondary battery, a radical compound is desirably stable. A stable radical as used herein refers to a compound whose radical form has a long life. A longer radical life is better, but it depends on various factors such as reactivity of the radical itself and ambient conditions such as a solvent.

A radical is a chemical species with an unpaired electron and a compound having the chemical species is a radical compound. A radical is generally highly reactive and is frequently an unstable species generated as an intermediate in a variety of reactions. Such an unstable radical forms a bond with a surrounding substance present in a reaction system and disappears in a certain life.

Some of stable radicals, however, do not form a bond with a surrounding substance and stably exist for a relatively longer period. These compounds stabilize a radical by steric hindrance with an organic protective group or delocalization of a δ-electron. An electrode active material of this invention utilizes such a compound generally exhibiting a spin concentration of $10^{19}$ to $10^{23}$ spins/g determined by electron spin resonance spectroscopy for a long period, e.g., 1 sec or longer.

In particular, a stable radical compound herein is a compound in which a spin concentration of $10^{21}$ spins/g or more in an equilibrium state is kept for 1 sec or longer.

A radical compound herein is a compound having an unpaired electron as a uncombined hand and thus does not encompass a transition metal compound having a stable unpaired electron in its inner shell.

Generally, an electrode active material in a secondary battery may take either an oxidized or reduced form depending on its starting state and an electrode reaction, and this invention is wherein the active material comprises a radical compound either in a starting state or in an oxidized or reduced state. A charge/discharge mechanism is not clearly understood, but may be assumed that a radical group in an active material would be reversibly changed into a radical or ion state by an electrode reaction for accumulating charge. Furthermore, this invention is wherein an oxy radical compound directly contributes to an electrode reaction in a positive electrode or negative electrode, and therefore, an electrode used as an active material is not limited to one of the positive electrode and the negative electrode. A radical compound is, however, preferably used as an electrode active material in a positive electrode in the light of an energy density. For stability, an electrode reaction during discharge among electrode reactions in a positive electrode is that in which a radical compound is a reactant. Furthermore, when a product in this reaction forms a bond with a cation of an electrolyte salt, further improvement in stability may be expected. There are herein no restrictions to the electrolyte cation, but a lithium ion is preferable in the light of a capacity.

Examples of a radical compound in this invention include a compound having a nitroxyl radical group, an oxy radical compound, a compound having a sulfur radical, a compound having a radical on its nitrogen atom and a compound having a carbon radical.

Nitroxyl Radical Compound

A nitroxyl radical compound particularly exhibits good radical stability. A nitroxyl radical compound refers to a compound having a nitroxyl radical group represented by formula (A1).

A nitroxyl radical group is a substituent in which an oxygen atom forming a nitroxide group having a bond between the oxygen and nitrogen has an unpaired electron. Generally, a radical compound is a highly reactive chemical species. It is, therefore, frequently unstable and interacts with a surrounding material to disappear within a certain life. A nitroxyl radical compound is, however, wherein the unpaired electron on the oxygen atom is stabilized by an electroattracting group on the nitrogen atom.

Oxy Radical Compound

An oxy radical compound is a compound having a substituent comprising an oxygen atom having an unpaired electron. Generally, a oxy radical is a highly reactive chemical species. It is, therefore, frequently unstable and interacts with a surrounding material to disappear within a certain life, but may be stable depending on resonance effect, steric hindrance and solvation conditions. Some of these stable oxy radical compounds may exhibit a spin concentration of $10^{19}$ to $10^{23}$ spins/g determined by electron spin resonance spectroscopy for a long time.

When an oxy radical compound consists of lighter materials such as carbon, hydrogen and oxygen, a secondary battery with an energy density per a unit weight may be provided. Furthermore, since only an oxy radical site contributes to a reaction in a secondary battery according to this invention, the battery may be stable without dependency of cycle properties on diffusion of an active material. In addition, an unpaired electron which reacting as an electrode active material is localized on a radical atom in an oxy radical compound, so that a concentration of the oxy radical as a reaction site can be increased to provide a large-capacity secondary battery with a higher energy density.

Compound Having a Radical on a Nitrogen Atom

A compound having a radical on a nitrogen atom is a compound having a substituent comprising a nitrogen atom having an unpaired electron. Generally, a radical is a highly reactive chemical species. It is, therefore, frequently unstable and interacts with a surrounding material to disappear within a certain life, but may be stable depending on resonance effect, steric hindrance and solvation conditions. Some of these stable compounds having a radical on a nitrogen atom may exhibit a spin concentration of $10^{19}$ to $10^{23}$ spins/g determined by electron spin resonance spectroscopy for a long time.

DETAILED DESCRIPTION OF PREFERRED EMBODIMENTS

Materials Constituting an Electrode

Figure 1:
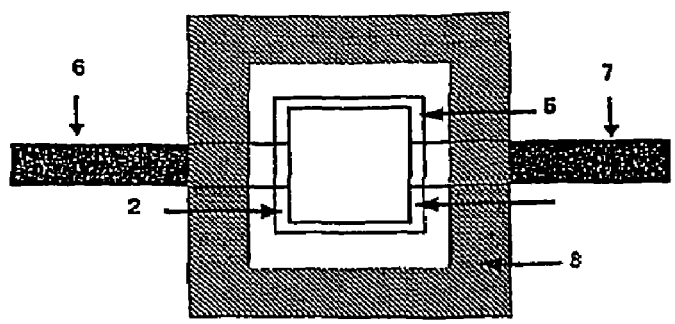
FIG. 1 is a plan view illustrating an embodiment of a secondary battery configuration according to this invention.

A secondary battery according to this invention may
(i) use a material comprising a radical compound as an active material, or
(ii) utilize an electrode reaction in which a radical compound is a reactant or product.

The electrode reaction in the above (ii) may be a discharge reaction in which a radical compound is a reactant or product. A discharge reaction in which a radical compound is a reactant may be, for example, that forming a bond between a radical compound and an electrolyte cation. A discharge reaction in which a radical compound is a product may be, for example, that cleaving a bond between a radical compound and an electrolyte cation.

Examples of a radical compound used in this invention include the nitroxyl radical compounds represented by chemical formulas 1 to 3; the polymer nitroxyl radical compounds represented by chemical formulas 4 to 6; the phenoxyl radical compounds represented by chemical formulas 7 and 8; the polymer phenoxyl radical compounds represented by chemical formulas 9 and 10; the hydrazyl radical compounds represented by chemical formulas 11 to 13; the hydrazyl radical compounds represented by chemical formulas 14 and 15; carbon radical compounds; sulfur radical compounds; and boron radical compounds. It may be a low-molecular weight or polymer compound. It may be a polymer compound in which one of the above compound is present. Furthermore, two or more radical compounds may be mixed. As shown in chemical formula 16, a substance forming a radical compound by releasing lithium by charging may be used.

A polymer compound as used herein is an aggregate of polymers having a large molecular weight, exhibiting insolubility in a variety of solvents due to its intermolecular interaction compared to a low molecular weight compound. Therefore, when a secondary battery is formed using a polymer radical compound, elution from an electrode may be minimized to provide good stability. It is necessary in this invention that a radical compound as an active material is retained on the electrode during charging/discharging. The radical compound is, therefore, preferably insoluble in a basic solvent constituting an electrolyte solution. However, when forming a large-capacity secondary battery, the amount of an electrolyte or electrolyte solution to an active material is so small that an insoluble radical compound with a solubility of about 1 g or less (the amount (grams) of a solute to 100 g of a solvent) may be stably retained on the electrode.

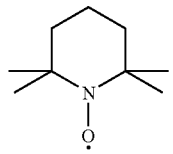

formula 1

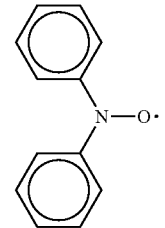

formula 2

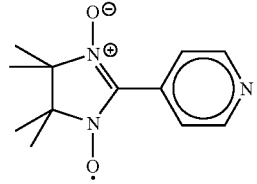

formula 3

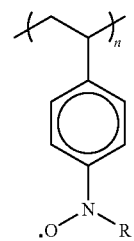

formula 4

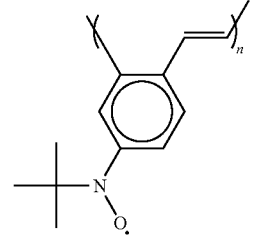

formula 5

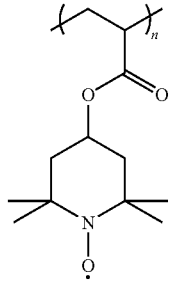

formula 6

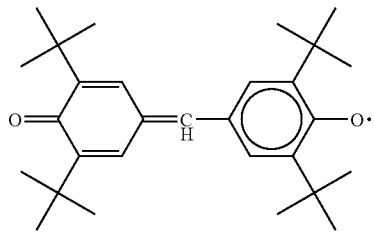

formula 7

-continued

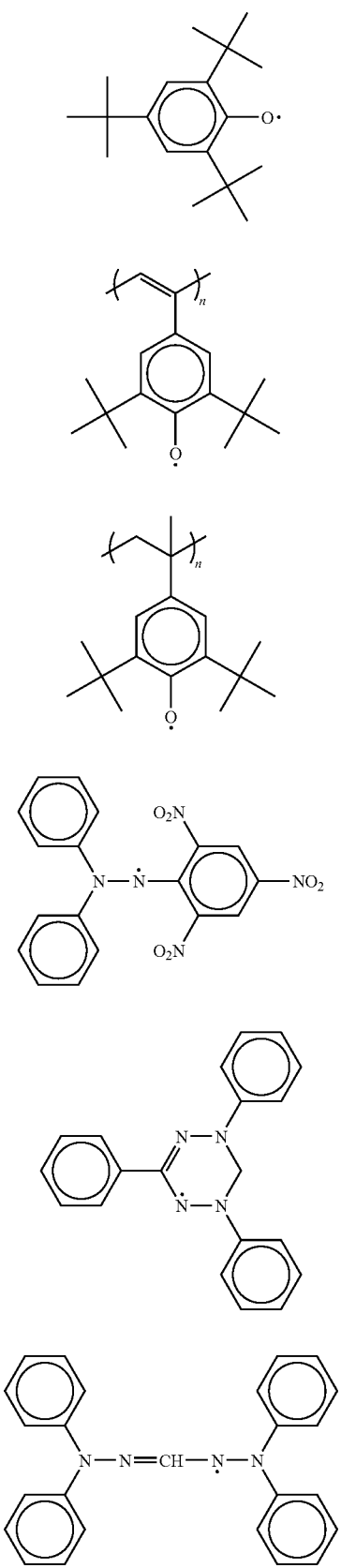

formula 8 formula 9 formula 10 formula 11 formula 12 formula 13

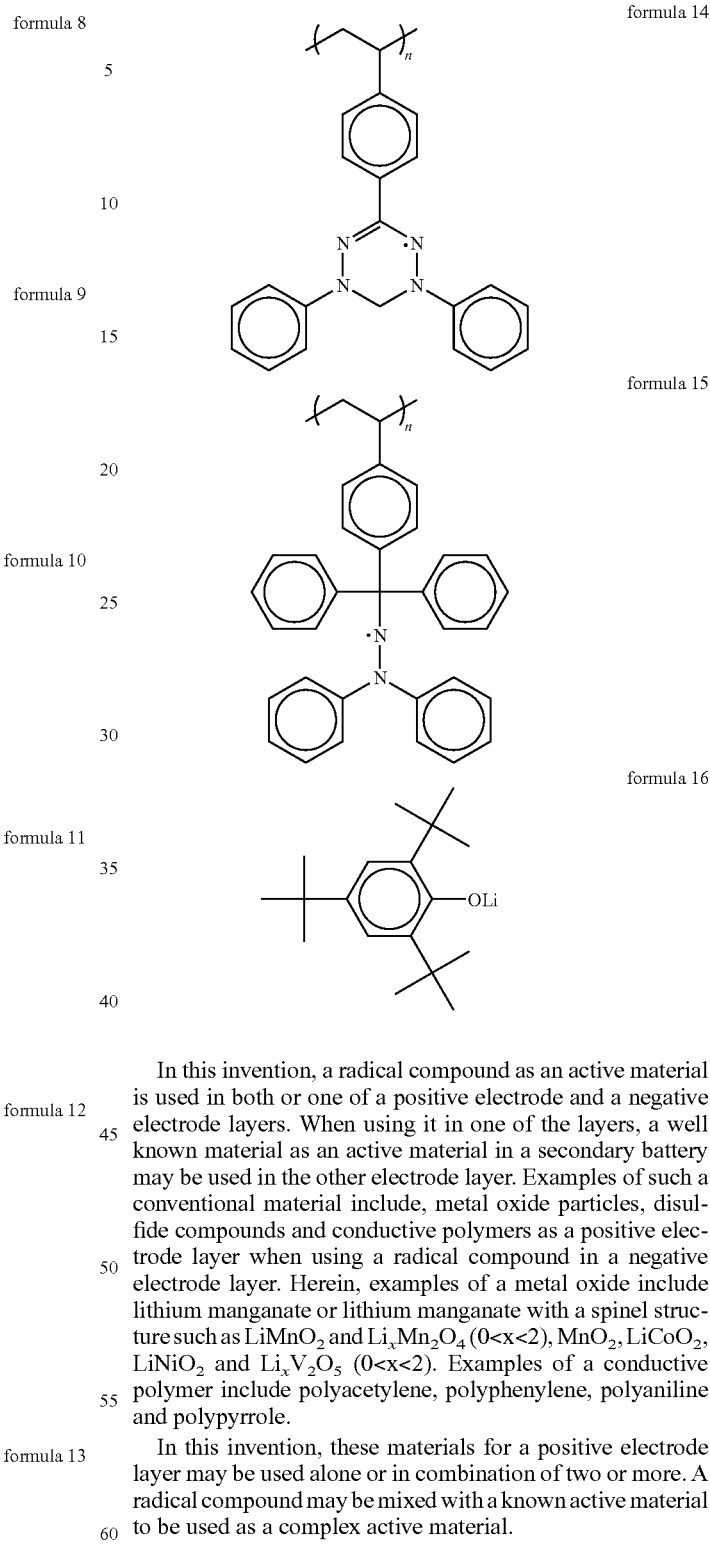

formula 14 formula 15 formula 16

In this invention, a radical compound as an active material is used in both or one of a positive electrode and a negative electrode layers. When using it in one of the layers, a well known material as an active material in a secondary battery may be used in the other electrode layer. Examples of such a conventional material include, metal oxide particles, disulfide compounds and conductive polymers as a positive electrode layer when using a radical compound in a negative electrode layer. Herein, examples of a metal oxide include lithium manganate or lithium manganate with a spinel structure such as $LiMnO_2$ and $Li_xMn_2O_4$ (0<x<2), $MnO_2$, $LiCoO_2$, $LiNiO_2$ and $Li_xV_2O_5$ (0<x<2). Examples of a conductive polymer include polyacetylene, polyphenylene, polyaniline and polypyrrole.

In this invention, these materials for a positive electrode layer may be used alone or in combination of two or more. A radical compound may be mixed with a known active material to be used as a complex active material.

On the other hand, when using a radical compound in a positive electrode, examples of a material for a negative electrode layer include carbon materials such as graphite and amorphous carbon, lithium metal or a lithium alloy, lithium-ion occluding carbon and conductive polymers. These materials may take an appropriate form such as film, bulk, granulated powder, fiber and flake.

In this invention, a conductive auxiliary material or ion-conductive auxiliary material may be added for reducing an impedance during forming an electrode layer comprising a radical compound. Examples of such a material include carbonaceous particles such as graphite, carbon black and acetylene black and conductive polymers such as polyaniline, polypyrrole, polythiophene, polyacetylene and polyacene as a conductive auxiliary material as well as a gel electrolyte and a solid electrolyte as an ion-conductive auxiliary material.

In this invention, a binder may be used for reinforcing binding between components. Examples of a binder include polyvinylidene fluoride, a copolymer of vinylidene fluoride and hexafluoropropylene, a copolymer of vinylidene fluoride and tetrafluoroethylene, polytetrafluoroethylene, a copolymer rubber of styrene and butadiene, and resin binders such as polypropylene, polyethylene and polyimide.

In this invention, a catalyst may be used for accelerating an electrode reaction. Examples of a catalyst include conductive polymers such as polyaniline, polypyrrole, polythiophene, polyacetylene and polyacene; basic compounds such as pyridine derivatives, pyrrolidone derivatives, benzimidazole derivatives, benzothiazole derivatives and acridine derivatives; and metal-ion complexes.

This invention is characterized in that an active material in at least one of a positive electrode and a negative electrode comprises a radical compound, but there are no restrictions to its amount. However, since a capacity as a secondary battery depends on the amount of the radical compound contained, the content is desirably 1 wt % or more for achieving adequate effects of this invention. The content lower than the limit may lead to inadequate effects of this invention of a higher energy density and a larger capacity.

Structure of a Second Battery

A secondary battery according to this invention has a configuration, for example, as shown in FIG. 1, where a negative electrode layer 1 and a positive electrode layer 2 are piled via a separator 5 containing an electrolyte. In this invention, an active material used in the negative electrode layer 1 or the positive electrode layer 2 is a radical compound.

Figure 2:
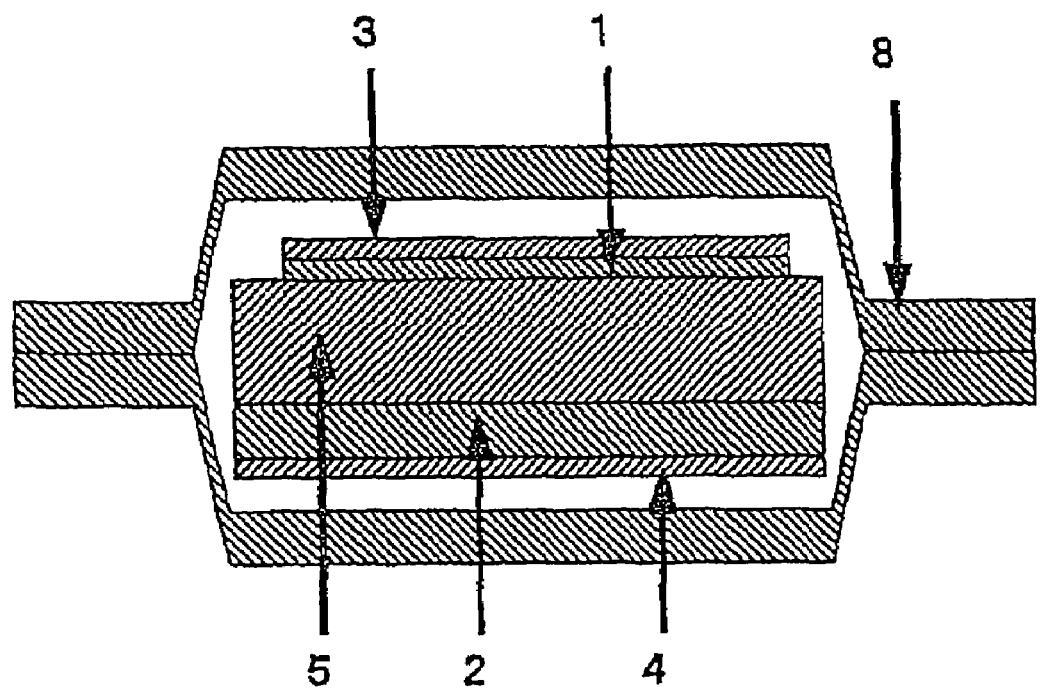
FIG. 2 is a cross section illustrating an embodiment of a secondary battery configuration according to this invention.

FIG. 2 is a cross section of a laminated secondary battery, where a positive electrode collector 4, a positive electrode layer 2, a separator 5 containing an electrolyte, a negative electrode layer 1 and a negative electrode collector 3 are piled in sequence. In this invention, a positive electrode and a negative electrode layers may be piled as appropriate; for example, the secondary battery may be a multi-layer laminate, a combination of collectors with layers on both sides and a rolled laminate.

The negative electrode collector 3 and the positive electrode collector 4 may be a metal foil or metal plate made of, for example, nickel, aluminum, copper, gold, silver, an aluminum alloy and stainless steel; a mesh electrode; and a carbon electrode. The collector may be active as a catalyst or an active material may be chemical bound to a collector. A separator made of a porous film or a nonwoven fabric may be used for preventing the above positive electrode from being in contact with the negative electrode.

An electrolyte contained in the separator 5 transfers charged carriers between the electrodes, i.e., the negative electrode 1 and the positive electrode 2, and generally exhibits an electrolyte-ion conductivity of $10^{-5}$ to $10^{-1}$ S/cm at room temperature. An electrolyte used in this invention may be an electrolyte solution prepared by, for example, dissolving an electrolyte salt in a solvent. Examples of such a solvent include organic solvents such as ethylene carbonate, propylene carbonate, dimethyl carbonate, diethyl carbonate, methyl ethyl carbonate, γ-butyrolactone, tetrahydrofurane, dioxolane, sulforane, dimethylformamide, dimethylacetamide and N-methyl-2-pyrrolidone. In this invention, these solvents may be used alone or in combination of two or more. Examples of an electrolyte salt include $LiPF_6$, $LiClO_4$, $LiBF_4$, $LiCF_3SO_3$, $LiN(CF_3SO_2)_2$, $LiN(C_2F_5SO_2)_2$, $LiC(CF_3SO_2)_3$ and $LiC(C_2F_5SO_2)_3$.

An electrolyte may be solid. Examples of a polymer used in the solid electrolyte include vinylidene fluoride polymers such as polyvinylidene fluoride, a copolymer of vinylidene fluoride and hexafluoropropylene, a copolymer of vinylidene fluoride and ethylene, a copolymer of vinylidene fluoride and monofluoroethylene, a copolymer of vinylidene fluoride and trifluoroethylene, a copolymer of vinylidene fluoride and tetrafluoroethylene and a terpolymer of vinylidene fluoride, hexafluoropropylene and tetrafluoroethylene; acrylonitrile polymers such a copolymer of acrylonitrile and methyl methacrylate, a copolymer of acrylonitrile and methyl acrylate, a copolymer of acrylonitrile and ethyl methacrylate, a copolymer of acrylonitrile and ethyl acrylate, a copolymer of acrylonitrile and methacrylic acid, a copolymer of acrylonitrile and acrylic acid and a copolymer of acrylonitrile and vinyl acetate; polyethylene oxide; a copolymer of ethylene oxide and propylene oxide; and polymers of these acrylates or methacrylates. The polymer may contain an electrolyte solution to form a gel or the polymer may be used alone.

A secondary battery in this invention may have a conventional configuration, where, for example, an electrode laminate or rolled laminate is sealed in, for example, a metal case, a resin case or a laminate film made of a metal foil such as aluminum foil and a synthetic resin film. It may take a shape of, but not limited to, cylindrical, prismatic, coin or sheet.

A secondary battery according to this invention may be prepared by a conventional process. For example, a slurry of an active material in a solvent is applied on an electrode laminate and the product is piled with a counter electrode via a separator. Alternatively, the laminate is rolled and placed in a case, which is then filled with an electrolyte solution. A secondary battery may be prepared using a radical compound itself or using a compound which can be converted into a radical compound by a redox reaction. Examples of a compound which can be converted into a radical compound by a redox reaction include a lithium or sodium salt of an anion generated by reduction of a radical compound. In this invention, a secondary battery may be prepared using a compound which can be converted into a radical compound as a result of a redox reaction.

Nitroxyl Radical Compound

A nitroxyl radical compound in this invention has a nitroxyl radical group in a molecular structure. Chemical formulas A12 to A49 shows specific examples of a nitroxyl radical compound.

A compound in which a bulky alkyl group is attached to a nitrogen atom forming a nitroxyl radical group is expected to be highly stable because of its steric hindrance. Such an alkyl is preferably tert-butyl. Chemical formulas (A12) to (A19) are examples of a compound in which a tert-butyl group is attached to a nitrogen atom forming a nitroxyl radical group.

In the light of stability in a radical, it is preferable that a carbon atom to which at least two alkyl groups are attached is bound to a nitrogen atom forming a nitroxyl radical group. In particular, when the nitrogen atom is bound to two carbon atoms to each of which at least two alkyl groups are attached, it may be expected that a more stable radical compound is provided. The alkyl group herein is preferably methyl. Chemical formulas (A12) to (A20) and (A24) to (A48) show examples of a compound in which a carbon atom to which two methyl groups are attached is bound to a nitrogen atom forming a nitroxyl radical group.

A compound in which an aryl group is attached to a nitrogen atom forming a nitroxyl radical group is expected to be more stable because of electron delocalization. The aromatic group herein is preferably a substituted or unsubstituted phenyl group in the light of stability. Chemical formulas (A13) to (A19) and (A21) and (A22) show examples of a compound in which an aryl group is attached to a nitrogen atom forming a nitroxyl radical group.

When a nitrogen atom forming a nitroxyl radical group is one member of a heterocycle, it may be expected that stability of a radical is improved because it may inhibit an intramolecular reaction of the nitroxyl radical group. The heterocycle herein is preferably a piperidinoxy, pyrrolidinoxy or pyrrolinoxy ring in the light of stability. Chemical formulas (A23) to (A48) show examples of a compound in which a nitrogen atom forming a nitroxyl radical group is one member of a heterocycle; specifically, chemical formulas (A26) to (A30) for a piperidinoxy ring, chemical formulas (A31) to (A36) for a piperidinoxy ring and chemical formulas (A37) to (A41) for a piperidinoxy ring.

When a nitroxyl radical group forms a nitroxylnitroxide structure, it may be expected that a radical is more stable because of electron delocalization. Chemical formulas (A43) to (A48) show examples of a compound having a nitroxylnitroxide structure.

A compound in which a nitroxy radical compound is a polymer compound is preferable because it is resistant to dissolving by an electrolyte solution to give good stability without deterioration for a long time. Such a polymer compound may be straight, cyclic or branched. Furthermore, a compound having a polyacetylene or polyphenylene vinylene chain as a main chain may be highly stable because of electronic delocalization.

A nitroxyl radical compound as an active material in a secondary battery according to this invention may be a solid or a solution, without any restriction in terms of operation. It is, however, preferably insoluble in a basic solvent in the light of a rate and an efficiency in charge/discharge. There are no restrictions to a molecular weight of a nitroxyl radical compound in this invention, and a variety of molecular weight may be thus acceptable from a compound with a low molecular weight to a polymer compound. However, a polymer is preferable in the light of stability of its charged or discharged state, particularly a polymer radical having a polyacetylene or polyphenylene structure. Examples of a compound in which a nitroxyl radical compound forms a polymer compound are shown in chemical formulas (A16) to (A20), (A22), (A25), (A29), (A30), (A42) and (A46) to (A48). Specifically, chemical formulas (A16), (A17), (A22), (A29), (A30) and (A46) show examples of a compound having a polyacetylene chain as a main chain while chemical formulas (A18), (A19) and (A47) show examples of a compound having a polyphenylene vinylene chain as a main chain.

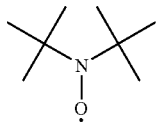

(A12)

-continued

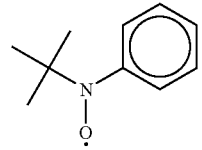

(A13)

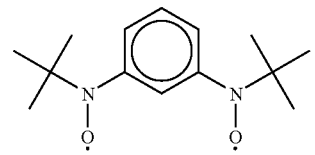

(A14)

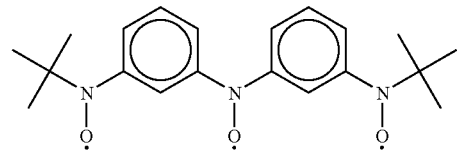

(A15)

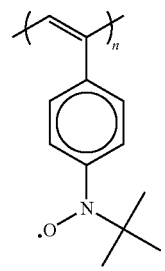

(A16)

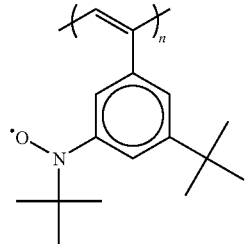

(A17)

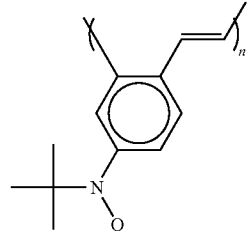

(A18)

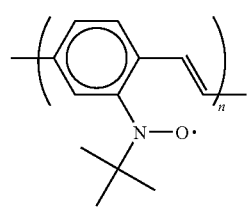

(A19)

-continued
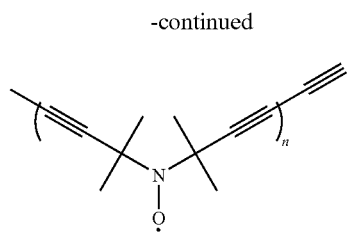 (A20)
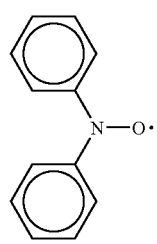 (A21)
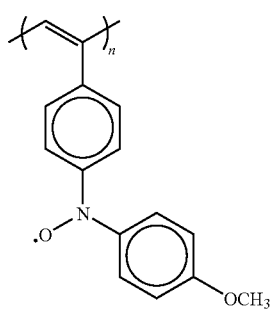 (A22)
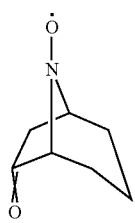 (A23)
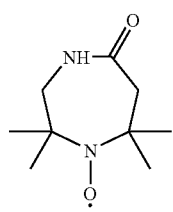 (A24)
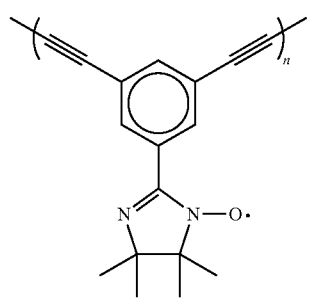 (A25)
-continued
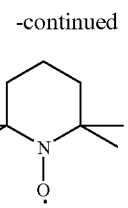 (A26)
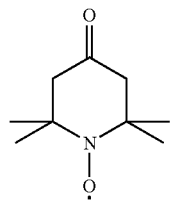 (A27)
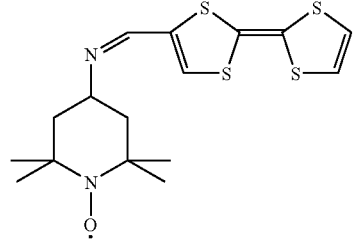 (A28)
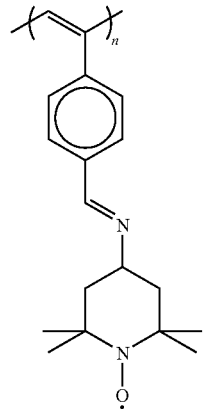 (A29)
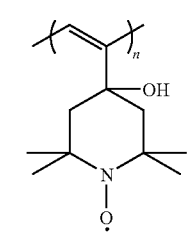 (A30)
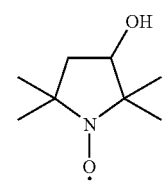 (A31)

-continued
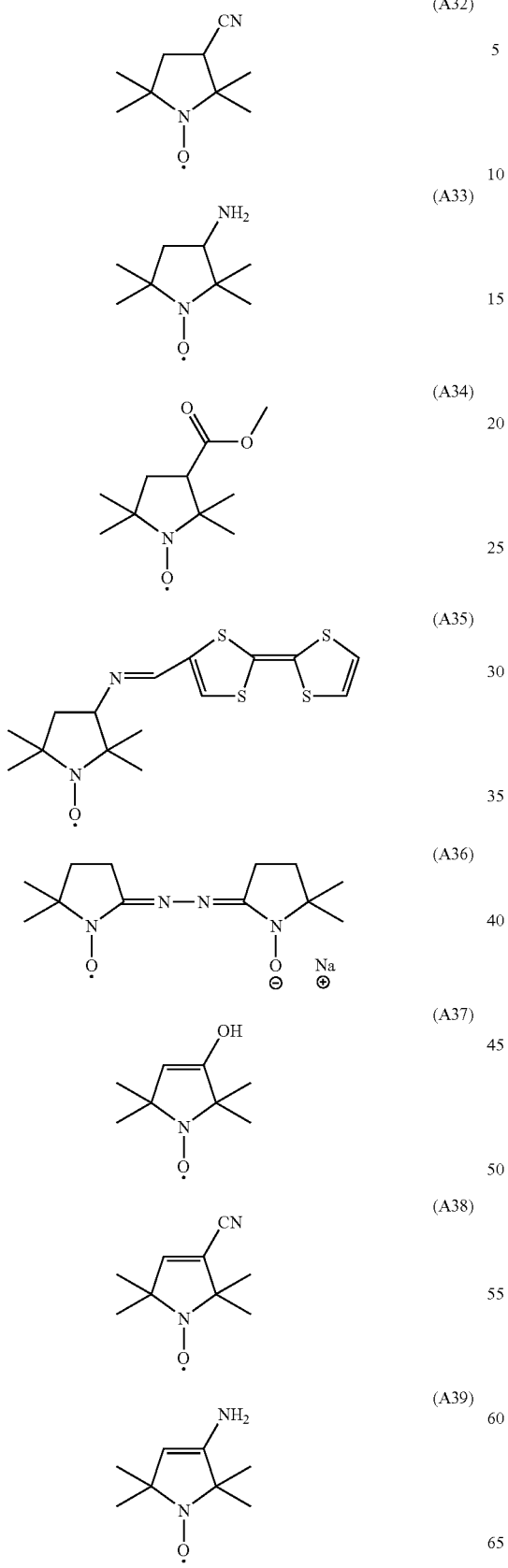
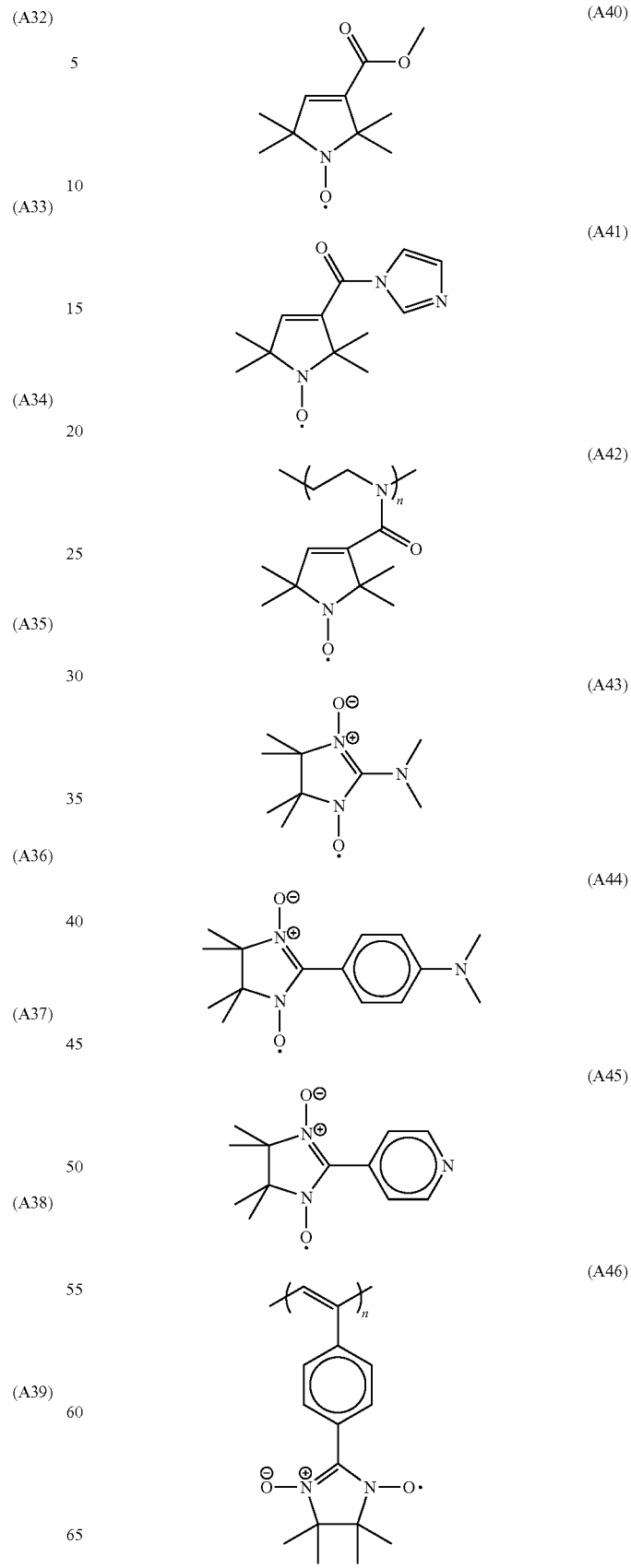

-continued
(A47)
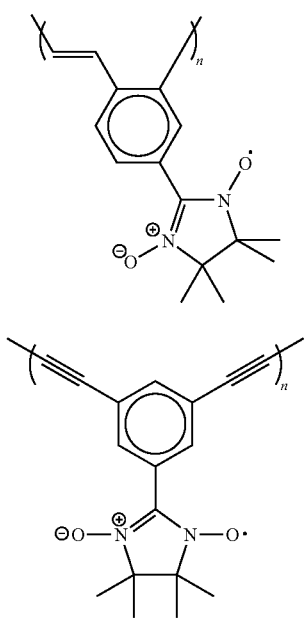
(A48)
Oxy Radical Compound
An oxy radical compound used in this invention has an oxy radical group in its molecular structure. It preferably has an aryloxy radical group or semiquinone in the light of stability of a radical state.
Examples of an oxy radical compound are shown below.
B1
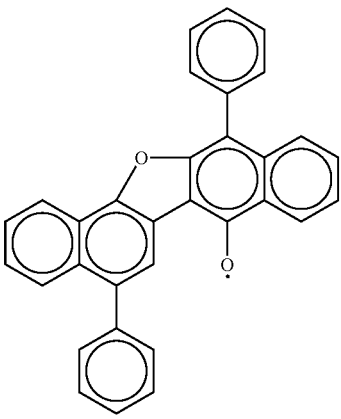
B2
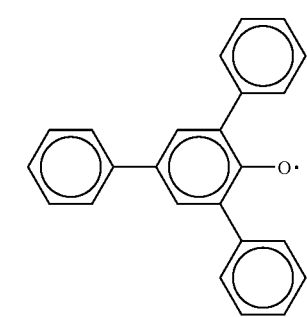
-continued
B3
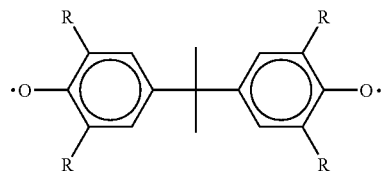
B4
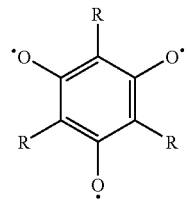
B5
B6
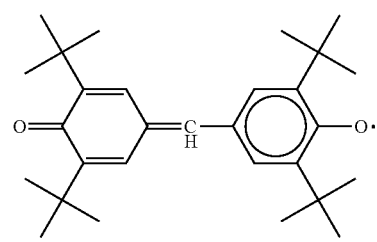
B7
B8
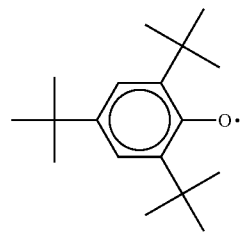
B9

-continued
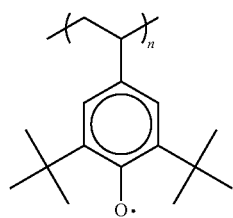
B10
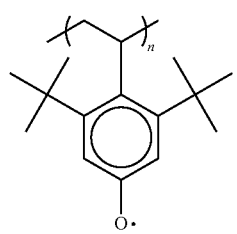
B11
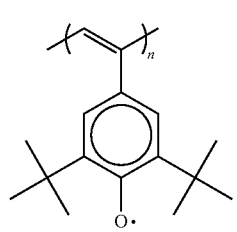
B12
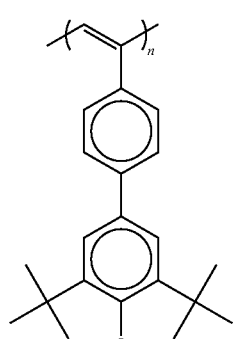
B13
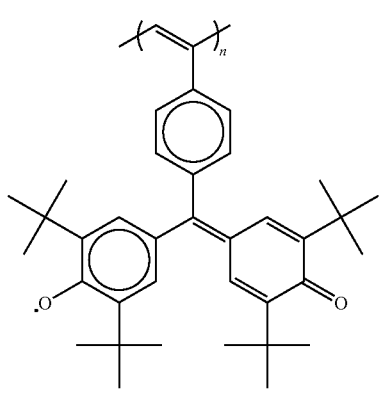
B14
-continued
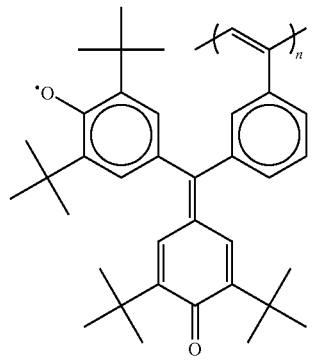
B15
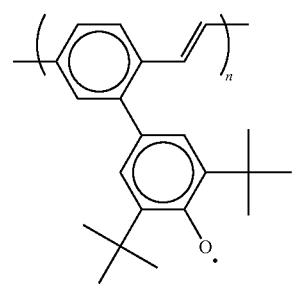
B16
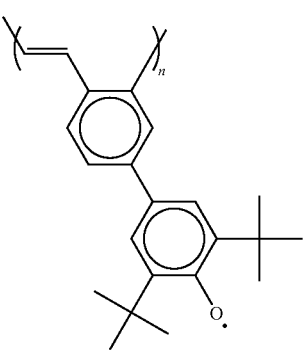
B17
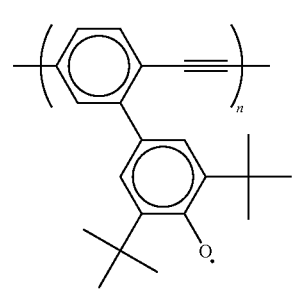
B18

B19
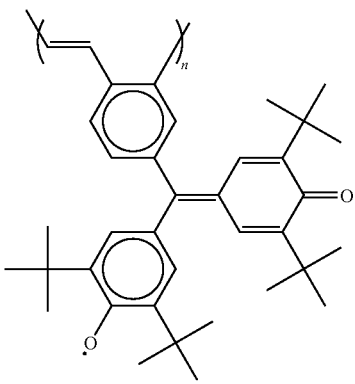

B20
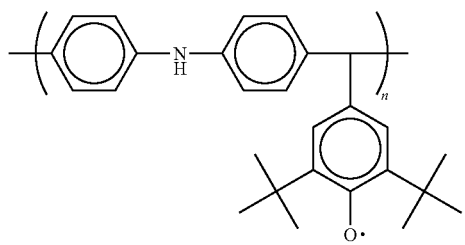

B21
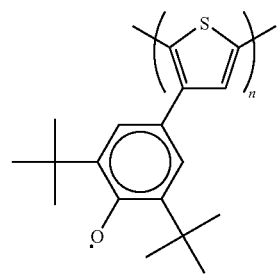

B22
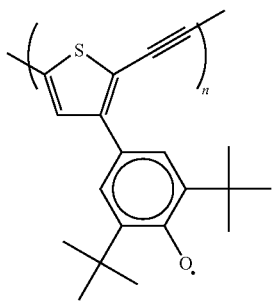

B23
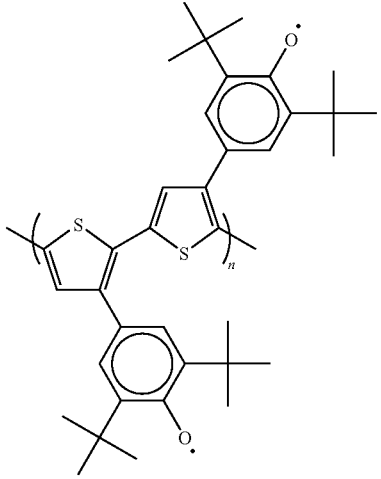

A compound having an aryloxy radical indicates an aromatic compound such as benzene, naphthalene and thiophene having an oxy radical group, while a compound having semiquinone indicates a structure formed by incomplete combustion of a benzenoid and a quinoid compounds. A compound having an aryloxy radical compound is preferably that having an arylpolyoxy radical group or a tertiary butyl group. A compound having a tertiary butyl group is that having a di-tert-butylphenoxy radical group. Examples of a compound having an aryloxy radical group are those shown in chemical formula B1 to 3 and their derivatives. Examples of a compound having an arylpolyoxy radical group are that shown in chemical formula B4 and its derivatives. Examples of an aryloxy radical compound having a di-tert-butyl group are those shown in chemical formulas B5 to 8 and their derivatives. Examples of a semiquinone are that shown in chemical formula B9 and its derivatives.

An oxy radical compound as an active material in a secondary battery according to this invention may be a solid or a solution, without any restriction in terms of operation. It is, however, preferably insoluble in a basic solvent in the light of a rate and an efficiency in charge/discharge. There are no restrictions to a molecular weight of an oxy radical compound in this invention, and a variety of molecular weight may be thus acceptable from a compound with a low molecular weight to a polymer compound. However, a polymer is preferable in the light of stability of its charged or discharged state, particularly a polymer radical compound having a polyolefin, polyacetylene, polyphenylene or five-membered aromatic heterocycle structure, most preferably a polymer radical compound having a three-dimensional network structure. Examples of a compound having a polyolefin structure are the polymer compounds shown in chemical formulas B10 to 11 and their derivatives. Examples of a compound having a polyacetylene structure are the polymer compounds shown in chemical formulas B12 to 15 and their derivatives. Examples of a compound having a polyphenylene structure are the polymer compounds shown in chemical formulas B16 to 20 and their derivatives. Examples of a compound having a five-membered aromatic heterocycle structure are the polymer compounds shown in chemical formulas B21 to 23 and their derivatives. Examples of a compound having a three-dimensional network structure are the compound shown in chemical formula B24 and its derivatives.

Compound Having a Radical on a Nitrogen Atom

A compound having a radical on a nitrogen atom used as an active material in this invention has a radical on a nitrogen atom in its molecular structure. Examples of the compound include those having a radical on an amino group as described in O. Shimamura et al., "Yuriki Hannou", Tokyo Kagaku Dojin, pp. 24-34 (1964); the compound having a radical on a pherdazyl group represented by chemical formula (C8):

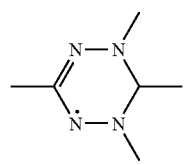
(C8)

the compound having a radical on a hydrazyl group represented by chemical formula (C9):

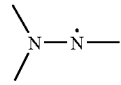
(C9)

polymer compounds as described in S. Okawara, "Kobunshi no Kagaku Hannou", Kagaku Dojin, pp. 340-346 (1972).

More specific examples include the lophine derivative represented by chemical formula (C10); the tetraphenylpyrrole derivative represented by chemical formula (C11); the phenothiazine derivative represented by chemical formula (C12); 2,2-diphenyl-1-picrylhydrazyl represented by chemical formula (C13); the 1,1,5,5-tetraphenyl-1,2,4,5-tetraaza-2-pentene derivative represented by chemical formula (C14); 1,3,5-triphenylpheldazyl represented by chemical formula (C15); the compounds having a triphenylpheldazyl group represented by chemical formulas (C16) and (C17); the polymer compounds having a triphenylpheldazyl group represented by chemical formulas (C18) to (C25); and the polymer compounds having an aminotriazine structure represented by chemical formulas (C26) to (C28).

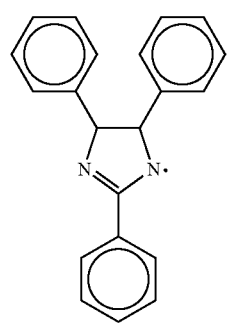
(C10)

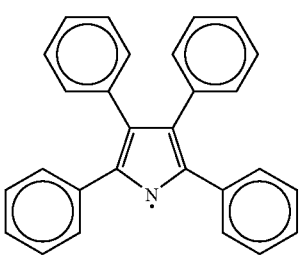
(C11)

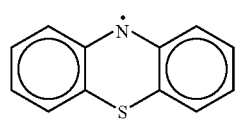
(C12)

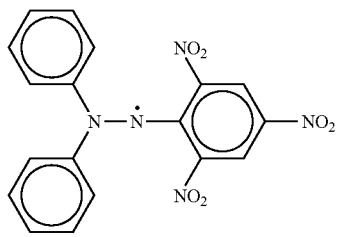
(C13)

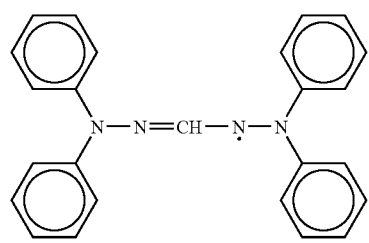
(C14)

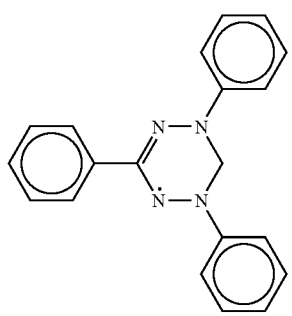
(C15)

-continued
(C16) 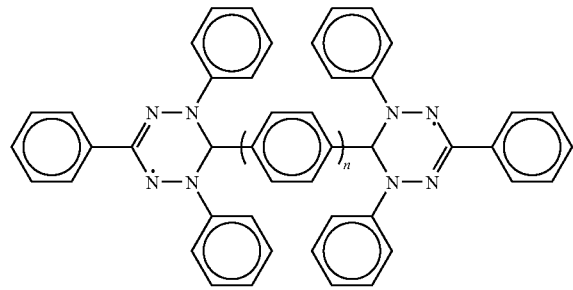
(C17) 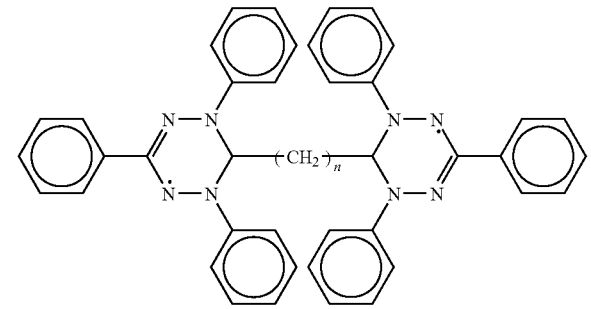
(C18) 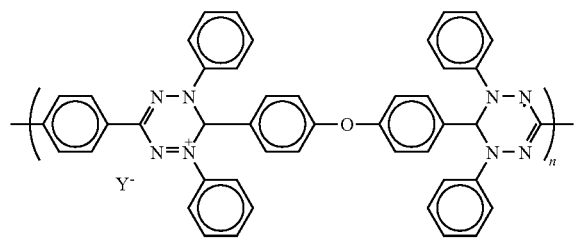
(C19) 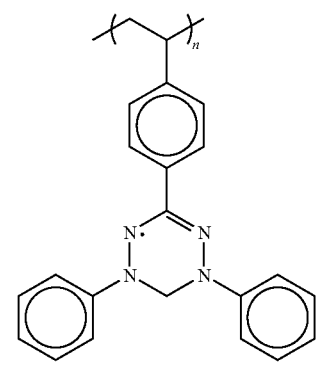
(C20) 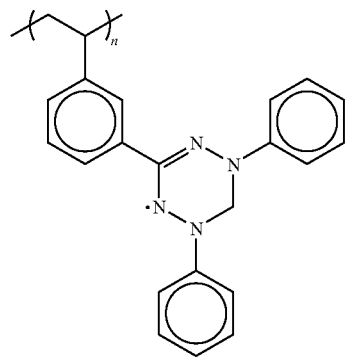
(C21) 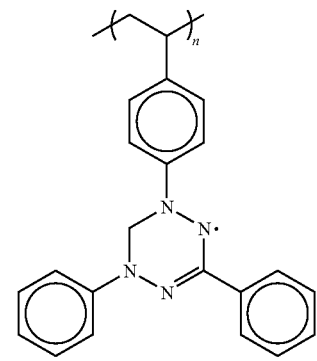
(C22) 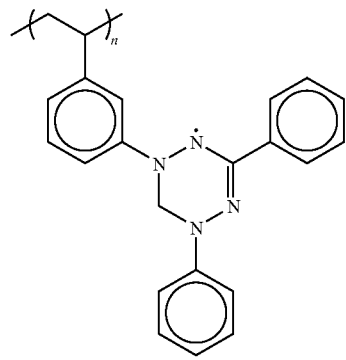
(C23) 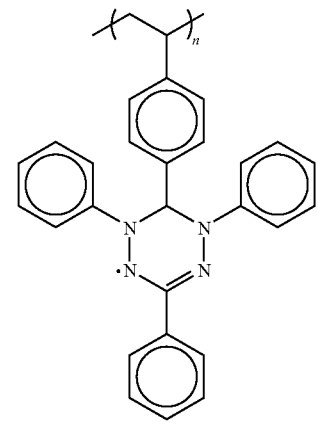

-continued
(C24)
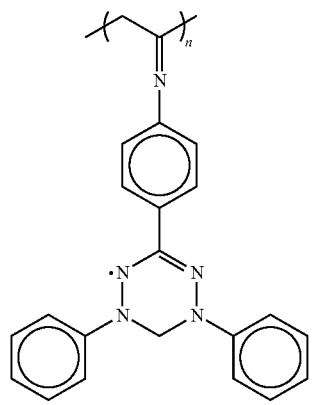
(C25)
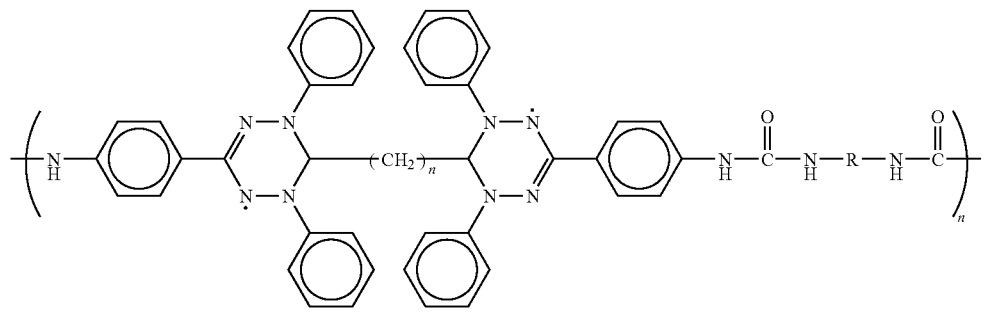
(C26)
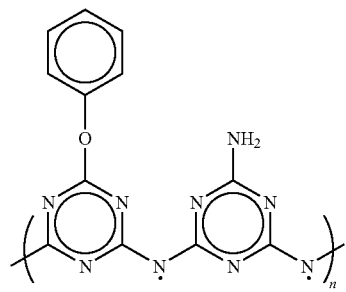
(C27)
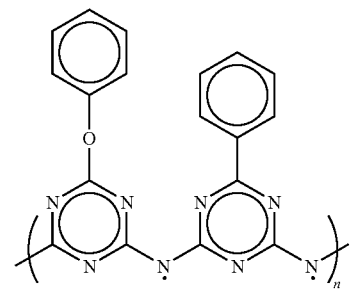
(C28)
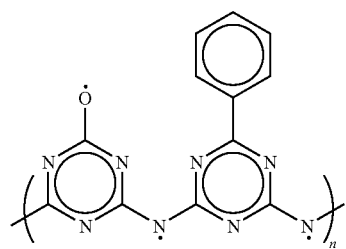
(C29)
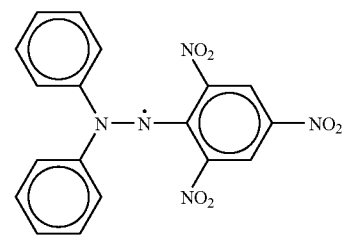
(C30)
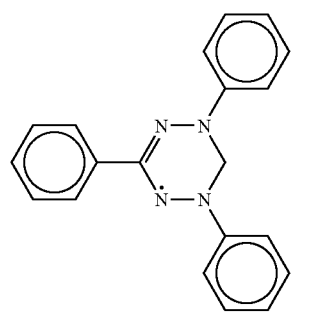
(C31)
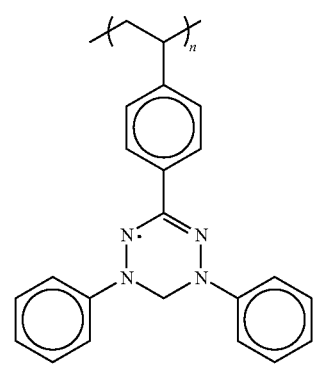

-continued (C32)

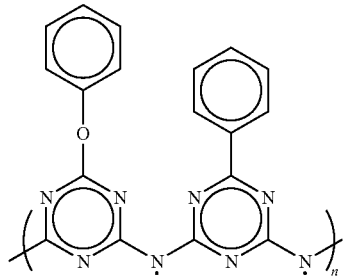

In the above formulae, n represents an integer of 1 to 8;

In the above formula C25, R represents, e.g., an alkylene or aromatic group;

In this invention, there are no restrictions to a molecular weight of a compound having a radical on a nitrogen atom and thus a compound with a low molecular weight from a polymer compound may be used as necessary. A polymer compound generally has a lower solubility in an electrolyte solution compared with a compound with a low molecular weight, so that a capacity reduction due to dissolution in the electrolyte solution is smaller. Examples of a polymer compound include those having any of the structures represented by chemical formulas C18 to C28, C31 and C32, as well as polymer compounds having a polyolefin, polyacetylene, polyphenylene or five-membered aromatic heterocycle structure. The polymer compound may have a three-dimensional network structure. A compound having a radical on a nitrogen atom as an active material in a secondary battery in this invention may be solid or may be dissolved or dispersed in an electrolyte. When using as a solid, it may be preferably insoluble or poorly soluble in an electrolyte solution because capacity reduction due to dissolution in an electrolyte solution may be minimized. A compound having a radical on a nitrogen atom as an active material in a secondary battery in this invention is generally used alone, or in combination of two or more or another type of active material.

EXAMPLES

This invention will be more specifically described with reference to Examples.

The compounds used in Examples 1 to 5 are as follows.

formula 1

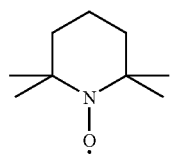

formula 2

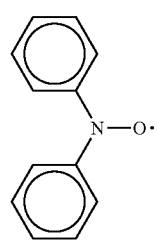

-continued formula 3

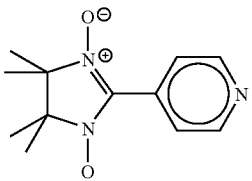

formula 4

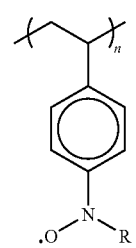

formula 5

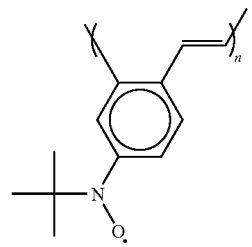

formula 6

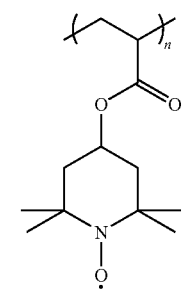

formula 7

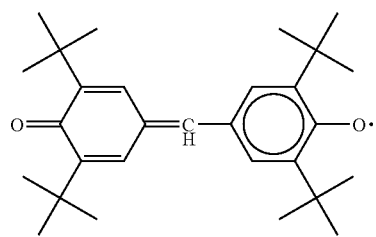

-continued formula 8

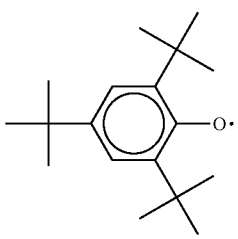

formula 9

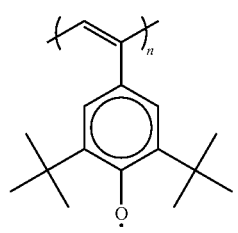

formula 10

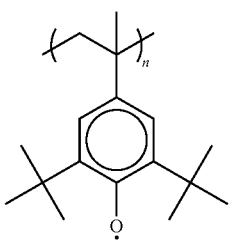

formula 11

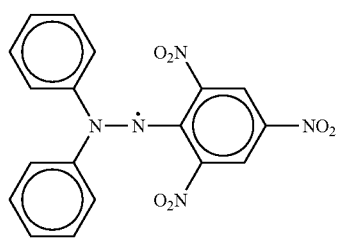

formula 12

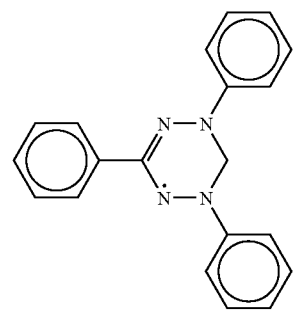

formula 13

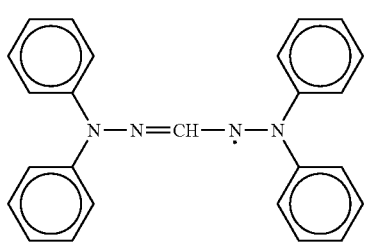

-continued formula 14

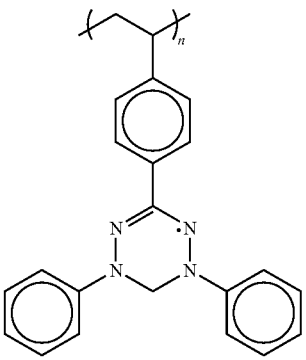

formula 15

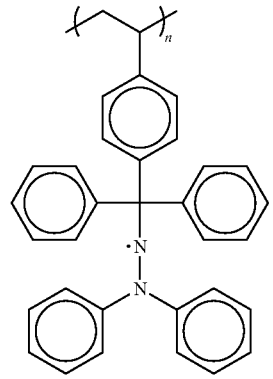

formula 16

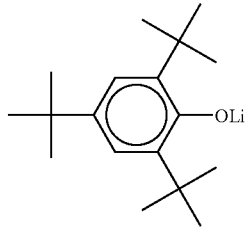

Example 1

In a dry box equipped with a gas purifier were mixed 60 mg of a copolymer of vinylidene fluoride and hexafluoropropylene and 140 mg of an electrolyte solution which was a 1:1 mixture of ethylene carbonate/propylene carbonate containing 1 mol/L of LiPF$_6$ electrolyte salt under an atmosphere of argon gas. To the mixture was added 1130 mg of tetrahydrofuran, and the mixture was dissolved to prepare a solution of a gel electrolyte in tetrahydrofuran.

In a separate glass vessel was placed 30 mg of 2,2,6,6-tetramethylpiperidoxyl radical (TEMPO radical) having the molecular structure represented by chemical formula 1, which is a nitroxyl radical compound, as a radical compound, then 60 mg of graphite powder as a conductive adjuvant and then 200 mg of the above solution of a gel electrolyte in tetrahydrofuran as an ion-conductive adjuvant, and the mixture was blended. To the mixture was added 1000 mg of tetrahydrofuran and the mixture was further blended until it became homogeneous to provide a black slurry. Then, 200 mg of the slurry was added dropwise on the surface of an aluminum foil (area: 1.5 cm×1.5 cm, thickness: 100 μm) with a lead, and the slurry was spread using a wire bar such that the overall surface became even. It was left for 60 min at room temperature to evaporate the solvent, tetrahydrofuran, and to form an organic compound layer containing TEMPO radical on the aluminum foil.

An aliquot of the applied film was taken, ground and subject to electron spin resonance spectroscopy. A spin concentration was determined with Model JEOL-JES-FR30 ESR spectrometer under the conditions of a microwave power of 4 mW, a modulation frequency of 100 kHz and a modulation width of 79 μT in a range of 335.9 mT±5 mT. An absorption area intensity was determined by integrating twice a first derivation type of ESR spectrum obtained as described above and compared with an absorption area intensity for a known sample measured under the same conditions to determine a spin concentration. As a result, a spin concentration was $10^{21}$ spin/g or higher, indicating formation of a radical in an initial state.

To 600 mg of a copolymer of vinylidene fluoride and hexafluoropropylene were added 1400 mg of the 1:1 mixture of ethylene carbonate/propylene carbonate containing 1 mol/L of $LiPF_6$ electrolyte salt and then 11.3 g of tetrahydrofuran, and the mixture was stirred at room temperature. After dissolving the copolymer of vinylidene fluoride and hexafluoropropylene, the mixture was applied on a stepped glass plate to a thickness of 1 mm. It was left for 1 hour for spontaneous evaporation of tetrahydrofuran to provide a gel electrolyte film with a thickness of 150 μm on the glass plate.

The gel electrolyte film cut by 2.0 cm×2.0 cm was laminated on the aluminum foil on which an organic compound layer containing TEMPO radical had been formed. On the foil was then laminated a copper foil having a lithium film with a lead (thickness: 30 μm for the lithium film and 20 μm for the copper foil). The whole product was sandwiched with polytetrafluoroethylene sheets with a thickness of 5 mm and was pressed to provide a secondary battery.

Figure 3:
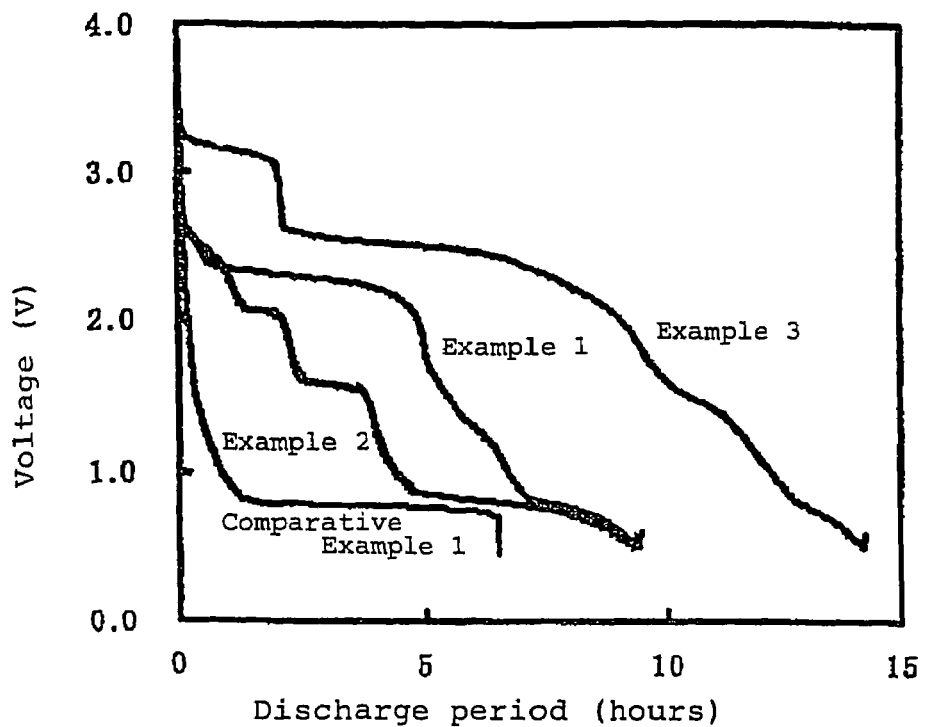
FIG. 3 shows discharge curves for a secondary battery determined in Examples 1 to 3 according to this invention and Comparative Example 1.

For the secondary battery thus prepared, discharge with a constant current of 0.1 mA was conducted using the aluminum foil with an organic compound layer containing TEMPO radical as a positive electrode and the copper foil with a lithium film as a negative electrode. The results are illustrated in FIG. 3, in which a voltage plateau can be found at about 2.3 V, indicating that the battery acted as a secondary battery. A part of the compound layer containing TEMPO radical was removed from the sample after discharge and it was subject to electron spin resonance spectroscopy as described above to give a spin concentration of $10^{19}$ spin/g or less. It indicates that after discharge, TEMPO radical formed a bond with lithium ion, leading to absence of effective radicals for a redox reaction.

Figure 4:
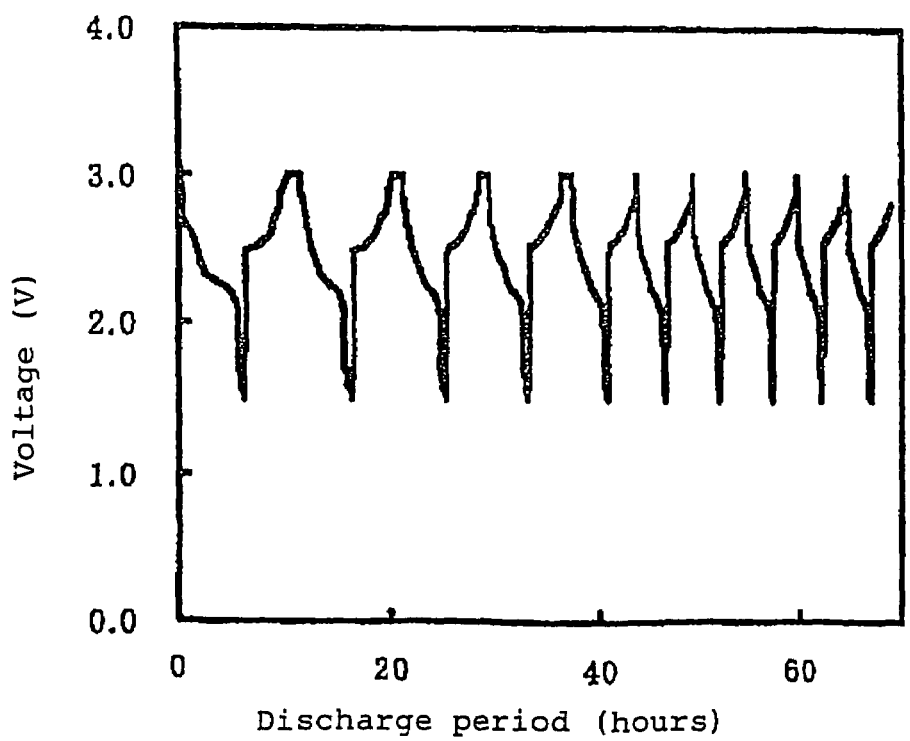
FIG. 4 shows a charge/discharge curve determined in Example 1 according to this invention.

Another secondary battery prepared as described above was evaluated for voltage variation in association with charge/discharge. The results obtained after 10 cycles of charge/discharge are illustrated in FIG. 4, in which a plateau is seen in a discharge curve after repeated charge/discharge, indicating that the battery also acted as a secondary battery.

Secondary batteries were prepared using the polymer compounds represented by chemical formulas 2, 3 and 4 to 6 in place of TEMPO radical in Example 1 as a nitroxyl radical compound. They also acted as a secondary battery as described in Example 1.

Comparative Example 1

In a glass vessel in Example 1 were mixed a conductive adjuvant, an ion-conductive adjuvant, a mixed solution of ethylene carbonate and propylene carbonate and tetrahydrofuran to prepare a black slurry as described in Example 1 except that TEMPO radical was absent. Then, on an aluminum foil was formed a compound layer without TEMPO radical as described in Example 1. A part of the layer was removed and subject to electron spin resonance spectroscopy as described in Example 1 to give a spin concentration of $10^{19}$ spin/g or less, indicating a smaller radical concentration.

The gel electrolyte film in Example 1 was laminated on the aluminum foil on which a compound layer without TEMPO radical had been formed and further a copper foil having a lithium film in Example 1 was laminated. The whole product was sandwiched with polytetrafluoroethylene sheets and was pressed as described in Example 1 to provide a secondary battery.

For the secondary battery thus prepared, discharge with a constant current of 0.1 mA was conducted using the aluminum foil without a compound layer without TEMPO radical as a positive electrode and the copper foil with a lithium film as a negative electrode. The results are illustrated in FIG. 3. The battery did not exhibited behavior as a secondary battery. When attempting charge by applying a constant current of 0.1 mA, a voltage momentarily exceeded 3.0 V and after discharge a plateau was not observed in a voltage curve. It indicated that the battery with this configuration did not act as a secondary battery.

Example 2

In a glass vessel in Example 1 were mixed a conductive adjuvant, an ion-conductive adjuvant, a mixed solution of ethylene carbonate and propylene carbonate and tetrahydrofuran to prepare a black slurry as described in Example 1 except that TEMPO radical was substituted with galvinoxyl radical having the molecular structure represented by chemical formula 7, a phenoxyl radical compound. Then, on an aluminum foil was formed a compound layer containing galvinoxyl radical as described in Example 1. A part of the layer was removed and subject to electron spin resonance spectroscopy as described in Example 1 to give a spin concentration of $10^{21}$ spin/g or more, indicating that a radical was formed in an initial state.

On the aluminum foil having the compound layer containing galvinoxyl radical were sequentially laminated the gel electrolyte film in Example 1 and the copper foil with a lithium film. Then, the whole product was sandwiched with polytetrafluoroethylene sheets and pressed to prepare a secondary battery as described in Example 1.

For the secondary battery thus prepared, discharge with a constant current of 0.1 mA was conducted using the aluminum foil with a compound layer containing galvinoxyl radical as a positive electrode and the copper foil with a lithium film as a negative electrode. The results are illustrated in FIG. 3, in which voltage plateaus can be found at about 2.3 V, 2.0 V and 1.5 V, indicating that the battery acted as a secondary battery. A part of the compound layer containing galvinoxyl radical was removed from the sample after discharge and it was subject to electron spin resonance spectroscopy as described in Example 1 to give a spin concentration of $10^{19}$ spin/g or less. It indicates that after discharge, galvinoxyl radical formed a bond with lithium ion, leading to absence of effective radicals for a redox reaction.

Voltage variation in association with charge/discharge was evaluated as described in Example 1. The results obtained indicated that the battery could be repeatedly charged/discharged and also acted as a secondary battery.

Secondary batteries were prepared using the polymer compounds represented by chemical formulas 8, 9 and 10 in place of galvinoxyl radical used in Example 2 as a phenoxyl radical compound. They also acted as a secondary battery as described in Example 2.

Example 3

In a glass vessel in Example 1 were mixed a conductive adjuvant, an ion-conductive adjuvant, a mixed solution of ethylene carbonate and propylene carbonate and tetrahydrofuran to prepare a black slurry as described in Example 1 except that TEMPO radical was substituted with 2,2-diphenyl-1-picrylhydrazyl radical (DPPH radical) having the molecular structure represented by chemical formula 11, a hydrazyl radical compound.

Then, on an aluminum foil was formed a compound layer containing DPPH radical as described in Example 1. A part of the layer was removed and subject to electron spin resonance spectroscopy as described in Example 1 to give a spin concentration of $10^{21}$ spin/g or more, indicating that a radical was formed in an initial state.

On the aluminum foil having the compound layer containing DPPH radical were sequentially laminated the gel electrolyte film in Example 1 and the copper foil with a lithium film. Then, the whole product was sandwiched with polytetrafluoroethylene sheets and pressed to prepare a secondary battery as described in Example 1.

For the secondary battery thus prepared, discharge with a constant current of 0.1 mA was conducted using the copper foil with a compound layer containing DPPH radical as a positive electrode and the copper foil with a lithium film as a negative electrode. The results are illustrated in FIG. 3, in which voltage plateaus can be found at about 3.1 V and 2.5 V, indicating that the battery acted as a secondary battery. A part of the compound layer containing DPPH radical was removed from the sample after discharge and it was subject to electron spin resonance spectroscopy as described in Example 1 to give a spin concentration of $10^{19}$ spin/g or less. It indicates that after discharge, DPPH radical formed a bond with lithium ion, leading to absence of effective radicals for a redox reaction.

Voltage variation in association with charge/discharge was evaluated as described in Example 1. The results obtained indicated that the battery could be repeatedly charged/discharged and also acted as a secondary battery.

Secondary batteries were prepared using the polymer compounds represented by chemical formulas 12, 13, 14 and 15 in place of DPPH radical used in Example 3 as a hydrazyl radical compound. They also acted as a secondary battery as described in Example 3.

Example 4

In a glass vessel in Example 1 were mixed a conductive adjuvant, an ion-conductive adjuvant, a mixed solution of ethylene carbonate and propylene carbonate and tetrahydrofuran to prepare a black slurry as described in Example 1 except that TEMPO radical was substituted with lithium 2,4,6-tri-tert-butylphenoxide having the molecular structure represented by chemical formula 16. Then, on an aluminum foil was formed a compound layer containing lithium 2,4,6-tri-tert-butylphenoxide as described in Example 1. A part of the layer was removed and subject to electron spin resonance spectroscopy as described in Example 1 to give a spin concentration of $10^{19}$ spin/g or less, indicating that there were no radicals in an initial state.

On the aluminum foil having the compound layer containing lithium 2,4,6-tri-tert-butylphenoxide were sequentially laminated the gel electrolyte film in Example 1 and the copper foil with a lithium film. Then, the whole product was sandwiched with polytetrafluoroethylene sheets and pressed to prepare a secondary battery as described in Example 1.

For the secondary battery thus prepared, discharge with a constant current of 0.1 mA was conducted using the copper foil with a compound layer containing lithium 2,4,6-tri-tert-butylphenoxide as a positive electrode and the copper foil with a lithium film as a negative electrode. When the battery voltage became 3.0 V, the voltage was kept constant. Then charge was terminated when a current value became 0.01 mA. After a 5 min interval, discharge was restarted to obtain a discharge curve. In the curve, a plateau can be found at about 2.3 V, indicating that the battery acted as a secondary battery. A part of the compound layer containing lithium 2,4,6-tri-tert-butylphenoxide was removed from the sample immediately after charge and it was subject to electron spin resonance spectroscopy as described in Example 1 to give a spin concentration of $10^{21}$ spin/g or more. It indicates that after charge, lithium 2,4,6-tri-tert-butylphenoxide was converted to 2,4,6-tri-tert-butylphenoxyl radical.

Voltage variation in association with charge/discharge was evaluated as described in Example 1. The results obtained indicated that the battery could be repeatedly charged/discharged and also acted as a secondary battery.

Example 5

On an aluminum foil was formed a compound layer containing lithium 2,4,6-tri-tert-butylphenoxide as described in Example 4. A part of the layer was removed and subject to electron spin resonance spectroscopy as described in Example 1 to give a spin concentration of $10^{19}$ spin/g or less, indicating that a radical concentration is low in an initial state.

Then, on a copper foil with a thickness of 20 μm was poured a slurry prepared by mixing polyvinylidene fluoride, N-methyl-2-pyrrolidone, powdered petroleum coke and acetylene black in a ratio of 1:30:20:1 by weight and the slurry was made even with a wire bar. After drying in vacuo at 100° C. for 2 hours, the product was cut in a size of 1.5 cm×1.5 cm to provide an electrode layer containing powdered petroleum coke.

On the aluminum foil having the compound layer containing lithium 2,4,6-tri-tert-butylphenoxide were sequentially laminated the gel electrolyte film in Example 4 and the electrode layer containing powdered petroleum coke. Then, the whole product was sandwiched with polytetrafluoroethylene sheets and pressed to prepare a secondary battery as described in Example 1.

For the secondary battery thus prepared, discharge with a constant current of 0.1 mA was conducted using the copper foil with a compound layer containing lithium 2,4,6-tri-tert-butylphenoxide as a positive electrode and the copper comprising a layer of powdered petroleum coke as a negative electrode. When the battery voltage became 3.0 V, the voltage was kept constant. Then charge was terminated when a current value became 0.01 mA. After a 5 min interval, discharge was started to obtain a discharge curve. In the curve, a plateau can be found at about 2.0 V, indicating that the battery acted as a secondary battery. A part of the compound layer containing lithium 2,4,6-tri-tert-butylphenoxide was removed from the sample immediately after charge and it was subject to electron spin resonance spectroscopy as described in Example 1 to give a spin concentration of $10^{21}$ spin/g or more. It indicates that after charge, lithium 2,4,6-tri-tert-butylphenoxide was converted to 2,4,6-tri-tert-butylphenoxyl radical.

Voltage variation in association with charge/discharge was evaluated as described in Example 1. The results obtained indicated that the battery could be repeatedly charged/discharged and also acted as a secondary battery.

Example 6

In a glass vessel in a dry box equipped with a gas purifier were sequentially placed 50 mg of 2,2,6,6-tetramethylpiperidinoxyl radical (TEMPOα radical) having the molecular structure represented by chemical formula (A26) and 60 mg of graphite powder as a conductive adjuvant under an atmosphere of argon. To the mixture were added 20 mg of a copolymer of vinylidene fluoride and hexafluoropropylene and 1 g of tetrahydrofuran, and the mixture was stirred for several minutes until it became homogeneous to provide a black slurry. A sample of TEMPOα radical used was subject to electron spin resonance spectroscopy as described in Example 1 to give a spin concentration of $10^{21}$ spin/g or more.

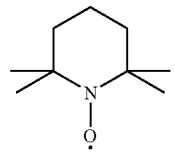

(A26)

Then, 200 mg of the slurry thus obtained was added dropwise on the surface of an aluminum foil (area: 1.5 cm×1.5 cm, thickness: 100 μm) with a lead, and the slurry was spread using a wire bar such that the overall surface became even. It was left for 60 mm at room temperature to evaporate the solvent, tetrahydrofuran, and to form a layer containing TEMPOα radical on the aluminum foil.

To 600 mg of a copolymer of vinylidene fluoride and hexafluoropropylene were added 1400 mg of the 1:1 mixture of ethylene carbonate/propylene carbonate containing 1 mol/L of $LiPF_6$ as an electrolyte salt and then 11.3 g of tetrahydrofuran, and the mixture was stirred at room temperature. After dissolving the copolymer of vinylidene fluoride and hexafluoropropylene, the mixture was applied on a stepped glass plate. It was left for 1 hour for spontaneous evaporation of tetrahydrofuran to provide a cast film with a thickness of 1 mm.

The gel electrolyte film cut by 2.0 cm×2.0 cm was laminated on the aluminum foil prepared above on which an electrode layer containing TEMPOα radical had been formed. On the foil was then laminated a copper foil having a lithium film with a lead (thickness: 30 μm for the lithium film and 20 μm for the copper foil). The whole product was sandwiched with polytetrafluoroethylene sheets with a thickness of 5 mm and was pressed to provide a secondary battery.

For a sample of the secondary battery thus prepared, discharge with a constant current of 0.1 mA was conducted using the electrode layer containing TEMPOα radical as a positive electrode and the copper foil with a lithium film as a negative electrode, indicating its action as a secondary battery. Repeated charge/discharge for the secondary battery indicated that the battery acted as a secondary battery capable of charge/discharge for 10 cycles or more.

Example 7

In a glass vessel in a dry box equipped with a gas purifier were sequentially placed 50 mg of dibutylnitroxyl radical (DBNO radical) having the molecular structure represented by chemical formula (A12) and 60 mg of graphite powder as a conductive adjuvant under an atmosphere of argon. To the mixture were added 20 mg of a copolymer of vinylidene fluoride and hexafluoropropylene and 1 g of tetrahydrofuran, and the mixture was stirred for several minutes until it became homogeneous to provide a black slurry. A sample of DBNO radical used was subject to electron spin resonance spectroscopy as described in Example 1 to give a spin concentration of $10^{21}$ spin/g or more.

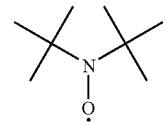

(A12)

Then, 200 mg of the slurry thus obtained was added dropwise on the surface of an aluminum foil (area: 1.5 cm×1.5 cm, thickness: 100 μm) with a lead, and the slurry was spread using a wire bar such that the overall surface became even. It was left for 60 min at room temperature to evaporate the solvent, tetrahydrofuran, and to form a layer containing DBNO radical on the aluminum foil.

To 600 mg of a copolymer of vinylidene fluoride and hexafluoropropylene were added 1400 mg of the 1:1 mixture of ethylene carbonate/propylene carbonate containing 1 mol/L of $LiPF_6$ as an electrolyte salt and then 11.3 g of tetrahydrofuran, and the mixture was stirred at room temperature. After dissolving the copolymer of vinylidene fluoride and hexafluoropropylene, the mixture was applied on a stepped glass plate. It was left for 1 hour for spontaneous evaporation of tetrahydrofuran to provide a cast film with a thickness of 1 mm.

The gel electrolyte film cut by 2.0 cm×2.0 cm was laminated on the aluminum foil prepared above on which an electrode layer containing DBNO radical had been formed. On the foil was then laminated a copper foil having a lithium film with a lead (thickness: 30 μm for the lithium film and 20 μm for the copper foil). The whole product was sandwiched with polytetrafluoroethylene sheets with a thickness of 5 mm and was pressed to provide a secondary battery.

For a sample of the secondary battery thus prepared, discharge with a constant current of 0.1 mA was conducted using the electrode layer containing DBNO radical as a positive electrode and the copper foil with a lithium film as a negative electrode, indicating its action as a secondary battery. Repeated charge/discharge for the secondary battery indicated that the battery acted as a secondary battery capable of charge/discharge for 10 cycles or more.

Example 8

In a glass vessel in a dry box equipped with a gas purifier were sequentially placed 50 mg of diphenylnitroxyl radical (DPNO radical) having the molecular structure represented by chemical formula (A21) and 60 mg of graphite powder as a conductive adjuvant under an atmosphere of argon. To the mixture were added 20 mg of a copolymer of vinylidene fluoride and hexafluoropropylene and 1 g of tetrahydrofuran, and the mixture was stirred for several minutes until it became homogeneous to provide a black slurry. A sample of DPNO radical used was subject to electron spin resonance spectroscopy as described in Example 1 to give a spin concentration of $10^{21}$ spin/g or more.

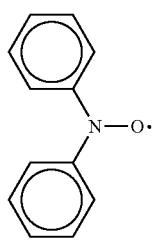

(A21)

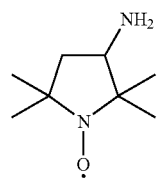

(A33)

Then, 200 mg of the slurry thus obtained was added dropwise on the surface of an aluminum foil (area: 1.5 cm×1.5 cm, thickness: 100 μm) with a lead, and the slurry was spread using a wire bar such that the overall surface became even. It was left for 60 min at room temperature to evaporate the solvent, tetrahydrofuran, and to form a layer containing DPNO radical on the aluminum foil.

To 600 mg of a copolymer of vinylidene fluoride and hexafluoropropylene were added 1400 mg of the 1:1 mixture of ethylene carbonate/propylene carbonate containing 1 mol/L of $LiPF_6$ as an electrolyte salt and then 11.3 g of tetrahydrofuran, and the mixture was stirred at room temperature. After dissolving the copolymer of vinylidene fluoride and hexafluoropropylene, the mixture was applied on a stepped glass plate. It was left for 1 hour for spontaneous evaporation of tetrahydrofuran to provide a cast film with a thickness of 1 mm.

The gel electrolyte film cut by 2.0 cm×2.0 cm was laminated on the aluminum foil prepared above on which an electrode layer containing DPNO radical had been formed. On the foil was then laminated a copper foil having a lithium film with a lead (thickness: 30 μm for the lithium film and 20 μm for the copper foil). The whole product was sandwiched with polytetrafluoroethylene sheets with a thickness of 5 mm and was pressed to provide a secondary battery.

For a sample of the secondary battery thus prepared, discharge with a constant current of 0.1 mA was conducted using the electrode layer containing DPNO radical as a positive electrode and the copper foil with a lithium film as a negative electrode, indicating its action as a secondary battery. Repeated charge/discharge for the secondary battery indicated that the battery acted as a secondary battery capable of charge/discharge for 10 cycles or more.

Example 9

In a glass vessel in a dry box equipped with a gas purifier were sequentially placed 50 mg of 3-amino-2,2,6,6-tetramethylpyrrolidinoxyl radical (TEMPOβ radical) having the molecular structure represented by chemical formula (A33) and 60 mg of graphite powder as a conductive adjuvant under an atmosphere of argon. To the mixture were added 20 mg of a copolymer of vinylidene fluoride and hexafluoropropylene and 1 g of tetrahydrofuran, and the mixture was stirred for several minutes until it became homogeneous to provide a black slurry. A sample of the radical used was subject to electron spin resonance spectroscopy as described in Example 1 to give a spin concentration of $10^{21}$ spin/g or more.

Then, 200 mg of the slurry thus obtained was added dropwise on the surface of an aluminum foil (area: 1.5 cm×1.5 cm, thickness: 100 μm) with a lead, and the slurry was spread using a wire bar such that the overall surface became even. It was left for 60 min at room temperature to evaporate the solvent, tetrahydrofuran, and to form a layer containing TEMPOβ radical on the aluminum foil.

To 600 mg of a copolymer of vinylidene fluoride and hexafluoropropylene were added 1400 mg of the 1:1 mixture of ethylene carbonate/propylene carbonate containing 1 mol/L of $LiPF_6$ as an electrolyte salt and then 11.3 g of tetrahydrofuran, and the mixture was stirred at room temperature. After dissolving the copolymer of vinylidene fluoride and hexafluoropropylene, the mixture was applied on a stepped glass plate. It was left for 1 hour for spontaneous evaporation of tetrahydrofuran to provide a cast film with a thickness of 1 mm.

The gel electrolyte film cut by 2.0 cm×2.0 cm was laminated on the aluminum foil prepared above on which an electrode layer containing TEMPOβ radical had been formed. On the foil was then laminated a copper foil having a lithium film with a lead (thickness: 30 μm for the lithium film and 20 μm for the copper foil). The whole product was sandwiched with polytetrafluoroethylene sheets with a thickness of 5 mm and was pressed to provide a secondary battery.

For a sample of the secondary battery thus prepared, discharge with a constant current of 0.1 mA was conducted using the electrode layer containing TEMPOβ radical as a positive electrode and the copper foil with a lithium film as a negative electrode, indicating its action as a secondary battery. Repeated charge/discharge for the secondary battery indicated that the battery acted as a secondary battery capable of charge/discharge for 10 cycles or more.

Example 10

In a glass vessel in a dry box equipped with a gas purifier were sequentially placed 50 mg of 3-amino-2,2,6,6-tetramethylpyrrolinoxyl radical (TEMPOγ radical) having the molecular structure represented by chemical formula (A39) and 60 mg of graphite powder as a conductive adjuvant under an atmosphere of argon. To the mixture were added 20 mg of a copolymer of vinylidene fluoride and hexafluoropropylene and 1 g of tetrahydrofuran, and the mixture was stirred for several minutes until it became homogeneous to provide a black slurry. A sample of TEMPOγ radical used was subject to electron spin resonance spectroscopy as described in Example 1 to give a spin concentration of $10^{21}$ spin/g or more.

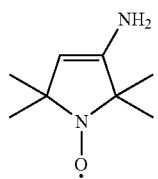

(A39)

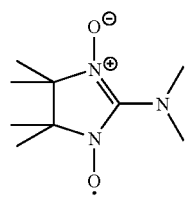

(A43)

Then, 200 mg of the slurry thus obtained was added dropwise on the surface of an aluminum foil (area: 1.5 cm×1.5 cm, thickness: 100 μm) with a lead, and the slurry was spread using a wire bar such that the overall surface became even. It was left for 60 min at room temperature to evaporate the solvent, tetrahydrofuran, and to form a layer containing TEMPOγ radical on the aluminum foil.

To 600 mg of a copolymer of vinylidene fluoride and hexafluoropropylene were added 1400 mg of the 1:1 mixture of ethylene carbonate/propylene carbonate containing 1 mol/L of $LiPF_6$ as an electrolyte salt and then 11.3 g of tetrahydrofuran, and the mixture was stirred at room temperature. After dissolving the copolymer of vinylidene fluoride and hexafluoropropylene, the mixture was applied on a stepped glass plate. It was left for 1 hour for spontaneous evaporation of tetrahydrofuran to provide a cast film with a thickness of 1 mm.

The gel electrolyte film cut by 2.0 cm×2.0 cm was laminated on the aluminum foil prepared above on which an electrode layer containing TEMPOγ radical had been formed. On the foil was then laminated a copper foil having a lithium film with a lead (thickness: 30 μm for the lithium film and 20 μm for the copper foil). The whole product was sandwiched with polytetrafluoroethylene sheets with a thickness of 5 mm and was pressed to provide a secondary battery.

For a sample of the secondary battery thus prepared, discharge with a constant current of 0.1 mA was conducted using the electrode layer containing TEMPOγ radical as a positive electrode and the copper foil with a lithium film as a negative electrode, indicating its action as a secondary battery. Repeated charge/discharge for the secondary battery indicated that the battery acted as a secondary battery capable of charge/discharge for 10 cycles or more.

Example 11

In a glass vessel in a dry box equipped with a gas purifier were sequentially placed 50 mg of nitronylnitroxide compound (NONO) having the molecular structure represented by chemical formula (A43) and 60 mg of graphite powder as a conductive adjuvant under an atmosphere of argon. To the mixture were added 20 mg of a copolymer of vinylidene fluoride and hexafluoropropylene and 1 g of tetrahydrofuran, and the mixture was stirred for several minutes until it became homogeneous to provide a black slurry. A sample of NONO used was subject to electron spin resonance spectroscopy as described in Example 1 to give a spin concentration of $10^{21}$ spin/g or more.

Then, 200 mg of the slurry thus obtained was added dropwise on the surface of an aluminum foil (area: 1.5 cm×1.5 cm, thickness: 100 μm) with a lead, and the slurry was spread using a wire bar such that the overall surface became even. It was left for 60 min at room temperature to evaporate the solvent, tetrahydrofuran, and to form a layer containing NONO on the aluminum foil.

To 600 mg of a copolymer of vinylidene fluoride and hexafluoropropylene were added 1400 mg of the 1:1 mixture of ethylene carbonate/propylene carbonate containing 1 mol/L of $LiPF_6$ as an electrolyte salt and then 11.3 g of tetrahydrofuran, and the mixture was stirred at room temperature. After dissolving the copolymer of vinylidene fluoride and hexafluoropropylene, the mixture was applied on a stepped glass plate. It was left for 1 hour for spontaneous evaporation of tetrahydrofuran to provide a cast film with a thickness of 1 mm.

The gel electrolyte film cut by 2.0 cm×2.0 cm was laminated on the aluminum foil prepared above on which an electrode layer containing NONO had been formed. On the foil was then laminated a copper foil having a lithium film with a lead (thickness: 30 μm for the lithium film and 20 μm for the copper foil). The whole product was sandwiched with polytetrafluoroethylene sheets with a thickness of 5 mm and was pressed to provide a secondary battery.

For a sample of the secondary battery thus prepared, discharge with a constant current of 0.1 mA was conducted using the electrode layer containing NONO as a positive electrode and the copper foil with a lithium film as a negative electrode, indicating its action as a secondary battery. Repeated charge/discharge for the secondary battery indicated that the battery acted as a secondary battery capable of charge/discharge for 10 cycles or more.

Example 12

In a glass vessel in a dry box equipped with a gas purifier were sequentially placed 50 mg of galvinoxyl having the molecular structure represented by chemical formula B5 and 60 mg of graphite powder as a conductive adjuvant under an atmosphere of argon. To the mixture were added 20 mg of a copolymer of vinylidene fluoride and hexafluoropropylene and 1 g of tetrahydrofuran, and the mixture was stirred for several minutes until it became homogeneous to provide a black slurry. A sample of galvinoxyl used was subject to electron spin resonance spectroscopy as described in Example 1 to give a spin concentration of $10^{21}$ spin/g or more, which indicated that the sample has the structure having an oxy radical represented by chemical formula 5 in an initial state.

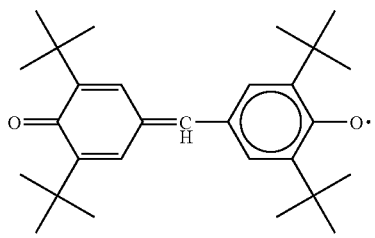

B5

Then, 200 mg of the slurry thus obtained was added dropwise on the surface of an aluminum foil (area: 1.5 cm×1.5 cm, thickness: 100 μm) with a lead, and the slurry was spread using a wire bar such that the overall surface became even. It was left for 60 min at room temperature to evaporate the solvent, tetrahydrofuran, and to form a layer containing galvinoxyl on the aluminum foil.

To 600 mg of a copolymer of vinylidene fluoride and hexafluoropropylene were added 1400 mg of the 1:1 mixture of ethylene carbonate/propylene carbonate containing 1 mol/L of $LiPF_6$ as an electrolyte salt and then 11.3 g of tetrahydrofuran, and the mixture was stirred at room temperature. After dissolving the copolymer of vinylidene fluoride and hexafluoropropylene, the mixture was applied on a stepped glass plate. It was left for 1 hour for spontaneous evaporation of tetrahydrofuran to provide a cast film with a thickness of 1 mm.

The gel electrolyte film cut by 2.0 cm×2.0 cm was laminated on the aluminum foil prepared above on which an electrode layer containing galvinoxyl radical had been formed. On the foil was then laminated a copper foil having a lithium film with a lead (thickness: 30 μm for the lithium film and 20 μm for the copper foil). The whole product was sandwiched with polytetrafluoroethylene sheets with a thickness of 5 mm and was pressed to provide a secondary battery.

For a sample of the secondary battery thus prepared, discharge with a constant current of 0.1 mA was conducted using the electrode layer containing galvinoxyl radical as a positive electrode and the copper foil with a lithium film as a negative electrode. The results showed a voltage plateau at about 2.3 V, indicating its action as a secondary battery. Repeated charge/discharge for the secondary battery indicated that the battery acted as a secondary battery capable of charge/discharge for 10 cycles or more. A part of the positive electrode layer was removed from the sample after discharge and was subject to electron spin resonance spectroscopy to give a spin concentration of $10^{19}$ spin/g or less. It suggested that after discharge, galvinoxyl radical was consumed due to its formation of a bond with lithium ion.

Example 13

Fifty milligrams of poly(vinyl-di-tert-butylphenol) was treated with equimolar potassium ferricyanide and sodium hydroxide to provide poly(vinyl-di-tert-butylphenoxy radical). The product was subject to electron spin resonance spectroscopy as described in Example 1 to give a spin concentration of $10^{21}$ spin/g or more. The results indicated that the product has the structure having an oxy radical represented by chemical formula B10 in an initial state.

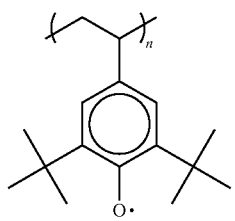

B10

A conductive adjuvant, a copolymer of vinylidene fluoride-hexafluoroethylene and tetrahydrofuran were mixed as described in Example 12, substituting poly(vinyl-di-tert-butylphenoxy radical) for galvinoxyl to provide a black slurry. Then, on an aluminum foil was formed a compound layer containing poly(vinyl-di-tert-butylphenoxy radical) as described in Example 12.

On the aluminum foil comprising poly(vinyl-di-tert-butylphenoxy radical) was laminated a cast film cut by 2.0 cm×2.0 cm prepared from a mixed solution of ethylene carbonate and propylene carbonate containing 1 mol/L of $LiPF_6$ as an electrolyte salt in Example 12 and a copolymer electrolyte of vinylidene fluoride and hexafluoropropylene. On the product was then laminated lithium as described in Example 12 to provide a secondary battery.

For a sample of the secondary battery thus prepared, discharge with a constant current of 0.1 mA was conducted using the electrode layer containing poly(vinyl-di-tert-butylphenoxy radical) as a positive electrode and the copper foil with a lithium film as a negative electrode. The results showed a voltage plateau at about 2.4 V, indicating its action as a secondary battery. Voltage variation with charge/discharge of the secondary battery was measured. The results indicated that the battery acted as a secondary battery. A part of the positive electrode layer was removed from the sample after discharge and was subject to electron spin resonance spectroscopy to give a spin concentration of $10^{19}$ spin/g or less. It suggested that after discharge, poly(vinyl-di-tert-butylphenoxy radical) in the positive electrode was consumed due to, for example, its formation of a bond with lithium ion.

Example 14

Acetyl-di-tert-butylphenol was reacted with molybdenum pentachloride in benzene at 40° C. to prepare poly(3,5-di-tert-butyl-4-hydroxyphenylacetylene). It was treated with potassium ferricyanide and sodium hydroxide as described in Example 13 to provide poly(acetyl-di-tert-butylphenoxy radical). The product was subject to electron spin resonance spectroscopy as described in Example 1 to give a spin concentration of $10^{21}$ spin/g or more. The results indicated that the product has the structure having an oxy radical represented by chemical formula B12 in an initial state.

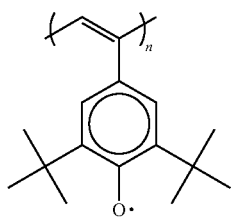

B12

A conductive adjuvant, a copolymer of vinylidene fluoride-hexafluoroethylene and tetrahydrofuran were mixed as described in Example 12, substituting poly(acetyl-di-tert-butylphenoxy radical) for galvinoxyl to provide a black slurry. Then, on an aluminum foil was formed a compound layer containing poly(acetyl-di-tert-butylphenoxy radical) as described in Example 12.

On the aluminum foil comprising poly(acetyl-di-tert-butylphenoxy radical) was laminated a cast film cut by 2.0 cm×2.0 cm prepared from a mixed solution of ethylene carbonate and propylene carbonate containing 1 mol/L of $LiPF_6$ as an electrolyte salt in Example 12 and a copolymer electrolyte of vinylidene fluoride and hexafluoropropylene. On the product was then laminated lithium as described in Example 12 to provide a secondary battery.

For a sample of the secondary battery thus prepared, discharge with a constant current of 0.1 mA was conducted using the electrode layer containing poly(acetyl-di-tert-butylphenoxy radical) as a positive electrode and the copper foil with a lithium film as a negative electrode. The results showed a voltage plateau at about 3.3 V, indicating its action as a secondary battery. Voltage variation with charge/discharge of the secondary battery was measured. The results indicated that the battery acted as a secondary battery. A part of the positive electrode layer was removed from the sample after discharge and was subject to electron spin resonance spectroscopy as described in Example 1 to give a spin concentration of $10^{19}$ spin/g or less. It suggested that after discharge, poly(acetyl-di-tert-butylphenoxy radical) in the positive electrode was consumed due to, for example, its formation of a bond with lithium ion.

Example 15

In an electrolysis cell was placed a solution or dispersion of 0.25 M of $LiAsF_6$, 0.25 M of $CuCl_2$ and 0.5 M of benzene in nitrobenzene. Two platinum plates were inserted into the solution/dispersion and electrolysis was conducted at a voltage of 10 V to form a conductive poly(paraphenylene) film with a film thickness of 10 μm on the surface of the positive electrode. At the end of the reaction, the electrodes were short-circuited and the film was then removed from the electrode. The poly(paraphenylene) film was placed in a vacuum vessel, heated to 450° C. with 0.1 mol of oxygen to its monomer unit and kept at the temperature for 2 hours. The film was cooled to room temperature to obtain a sample. NMR and IR spectra for the sample suggested the molecular structure of the semiquinone represented by chemical formula B9 in which a part of the poly(paraphenylene) was replaced with oxygen. ESR spectrum gave a spin concentration of $2\times10^{21}$ spin/g for the sample.

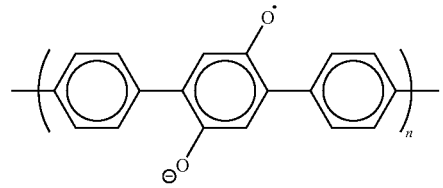

B9

The sample having the semiquinone structure was directly laminated on an aluminum foil and the product was pressed. On the aluminum foil was laminated a cast film cut by 2.0 cm×2.0 cm prepared from a mixed solution of ethylene carbonate and propylene carbonate containing 1 mol/L of $LiPF_6$ as an electrolyte salt in Example 12 and a copolymer electrolyte of vinylidene fluoride and hexafluoropropylene. On the product was then laminated lithium as described in Example 12 to provide a secondary battery.

For a sample of the secondary battery thus prepared, discharge with a constant current of 0.1 mA was conducted using the electrode comprising the compound having the semiquinone structure as a positive electrode and the copper foil with a lithium film as a negative electrode. The results showed a voltage plateau at about 3.1 V, indicating its action as a secondary battery. Voltage variation with charge/discharge of the secondary battery was measured. The results indicated that the battery acted as a secondary battery. A part of the positive electrode layer was removed from the sample after discharge and was subject to electron spin resonance spectroscopy to give a spin concentration of $10^{19}$ spin/g or less. It suggested that after discharge, the compound having the semiquinone structure in the positive electrode was consumed due to, for example, its formation of a bond with lithium ion.

Example 16

In an electrolysis cell was placed powdered 1,3,5-tris-diazo-cyclohexane-2,4,6-trione, which was then heated to 600° C. and kept at the temperature for 20 hours. The reaction was cooled to room temperature to obtain a sample. NMR and IR spectra for the sample suggested a network polyoxy radical whose molecular structure had the basic structure represented by chemical formula B4. ESR spectrum gave a spin concentration of $8\times10^{21}$ spin/g for the sample.

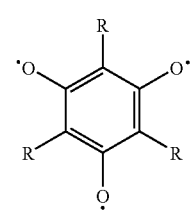

B4

A conductive adjuvant, a copolymer of vinylidene fluoride-hexafluoroethylene and tetrahydrofuran were mixed as described in Example 12, substituting the presumably network polyoxy radical for galvinoxyl to provide a black slurry. Then, on an aluminum foil was formed a compound layer containing the presumably network polyoxy radical as described in Example 12.

On the aluminum foil comprising the presumably network polyoxy radical was laminated a cast film cut by 2.0 cm×2.0 cm prepared from a mixed solution of ethylene carbonate and propylene carbonate containing 1 mol/L of $LiPF_6$ as an electrolyte salt in Example 12 and a copolymer electrolyte of vinylidene fluoride and hexafluoropropylene. On the product was then laminated lithium as described in Example 12 to provide a secondary battery.

For a sample of the secondary battery thus prepared, discharge with a constant current of 0.1 mA was conducted using the electrode layer containing the presumably network polyoxy radical as a positive electrode and the copper foil with a lithium film as a negative electrode. The results showed a voltage plateau at about 3.3 V, indicating its action as a secondary battery. Voltage variation with charge/discharge of the secondary battery was measured. The results indicated that the battery acted as a secondary battery. A part of the positive electrode layer was removed from the sample after discharge and was subject to electron spin resonance spectroscopy as described in Example 1 to give a spin concentration of $10^{19}$ spin/g or less. It suggested that after discharge, the presumably network polyoxy radical in the positive electrode was consumed due to, for example, its formation of a bond with lithium ion.

Example 17

There will be described a process for preparing a secondary battery using diphenylpicrylhydrazyl represented by chemical formula (C29) as an active material. In advance, diphenylpicrylhydrazyl was subject to electron spin resonance spectroscopy to give a spin concentration of $10^{21}$ spin/g or more.

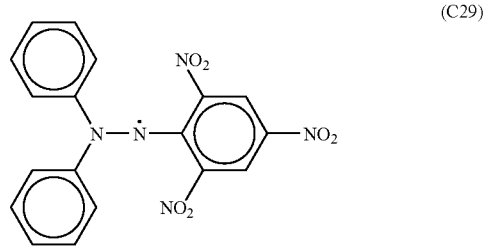

(C29)

In a dry box equipped with a gas purifier were mixed 60 mg of a copolymer of vinylidene fluoride and hexafluoropropylene and 140 mg of an electrolyte solution which was a 1:1 mixture of ethylene carbonate/propylene carbonate containing 1 mol/L of $LiPF_6$ electrolyte salt under an atmosphere of argon gas. To the mixture was added 1130 mg of tetrahydrofuran, and the mixture was dissolved to prepare a solution of a gel electrolyte in tetrahydrofuran. In a separate glass vessel was placed 30 mg of diphenylpicrylhydrazyl, then 60 mg of graphite powder as a conductive adjuvant and then 200 mg of the above solution of a gel electrolyte in tetrahydrofuran as an ion-conductive adjuvant, and the mixture was blended. To the mixture was added 1000 mg of tetrahydrofuran and the mixture was further stirred for 3 hours to provide a black slurry. Then, 200 mg of the slurry was added dropwise on the surface of an aluminum foil (area: 1.5 cm×1.5 cm, thickness: 100 μm) with a lead, and the slurry was spread using a wire bar such that the overall surface became even. It was left for 3 hours at room temperature to substantially evaporate the solvent, tetrahydrofuran, and to form an electrode layer containing diphenylpicrylhydrazyl on the aluminum foil.

To 600 mg of a copolymer of vinylidene fluoride-hexafluoropropylene were added 1400 mg of an electrolyte solution, i.e., a 1:1 mixed solution of ethylene carbonate/propylene carbonate containing 1 mol/L of LiPF6 as an electrolyte salt and 11.3 g of tetrahydrofuran, and the mixture was stirred at room temperature. After dissolving the copolymer of vinylidene fluoride-hexafluoropropylene, the solution was applied on a glass plate with a glass frame. The plate was dried in the air to evaporate tetrahydrofuran to provide a cast film with a thickness of 300 μm on the glass plate.

The gel electrolyte film cut by 2.0 cm×2.0 cm was laminated on the aluminum foil on which diphenylpicrylhydrazyl had been formed. On the foil was then laminated a copper foil having a lithium film with a lead (thickness: 30 μm for the lithium film and 20 μm for the copper foil). The whole product was sandwiched with polytetrafluoroethylene sheets with a thickness of 5 mm and was pressed to provide a secondary battery.

For the secondary battery thus prepared, discharge with a constant current of 0.1 mA was conducted using the electrode layer containing diphenylpicrylhydrazyl as a positive electrode and the copper foil with a lithium film as a negative electrode. A voltage was constant at about 2.5 V for about 5 hours and it took additional 12 hours for a voltage to be reduced to 1 V or less. It was found that a voltage was kept constant at about 2.5 V after 10 cycles of charge/discharge, indicating that the battery acted as a secondary battery. A part of the positive electrode layer cut from the sample after discharge was subject to electron spin resonance spectroscopy to give a spin concentration of $10^{19}$ spin/g or less. It would be because diphenylpicrylhydrazyl was converted into a compound without a radical in an electrode reaction during discharge. It was thought that diphenylpicrylhydrazyl acted as an active material in the positive electrode for action of the secondary battery.

Example 18

A secondary battery was prepared as described in Example 17, substituting triphenylpherdazyl having the molecular structure represented by chemical formula (C30) for diphenylpicrylhydrazyl, and discharge was conducted. In advance, triphenylpherdazyl was subject to electron spin resonance spectroscopy to give a spin concentration of $10^{21}$ spin/g or more.

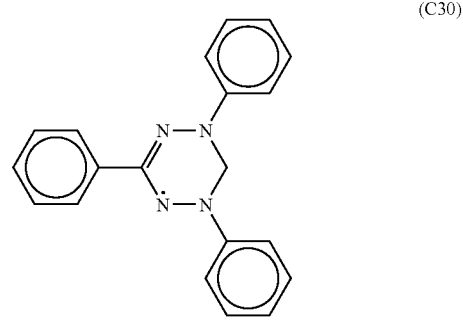

(C30)

For the secondary battery thus prepared, discharge with a constant current of 0.1 mA was conducted using the aluminum foil comprising a compound layer containing triphenylpherdazyl as a positive electrode and the copper foil with a lithium film as a negative electrode. A plateau was found at about 2.3 V and it took 8 hours for a voltage to be reduced to 1 V or less. A part of the positive electrode layer cut from the sample after discharge was subject to electron spin resonance spectroscopy to give a spin concentration of $10^{19}$ spin/g or less. It would be because triphenylpherdazyl was converted into a compound without a radical in an electrode reaction during discharge. It was thought that triphenylpherdazyl acted as an active material in the positive electrode for action of the secondary battery.

Example 19

A secondary battery was prepared as described in Example 17, substituting a polymer compound having the pherdazyl structure represented by chemical formula (C31) for diphenylpicrylhydrazyl, and discharge was conducted. In advance, the polymer compound having the molecular structure represented by chemical formula (C31) was subject to electron spin resonance spectroscopy to give a spin concentration of $10^{21}$ spin/g or more.

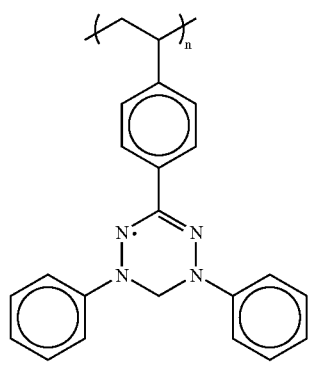

(C31)

For the secondary battery thus prepared, discharge with a constant current of 0.1 mA was conducted using the aluminum foil comprising the layer of the polymer compound having the molecular structure represented by chemical formula (C31) and the copper foil with a lithium film as a negative electrode. A plateau was found at about 2.3 V and it took 12 hours for a voltage to be reduced to 1 V or less.

Example 20

A secondary battery was prepared as described in Example 17, substituting a polymer compound having the aminotriazine structure represented by chemical formula (C32) for diphenylpicrylhydrazyl, and discharge was conducted. In advance, the polymer compound having the molecular structure represented by chemical formula (C32) was subject to electron spin resonance spectroscopy to give a spin concentration of $10^{21}$ spin/g or more.

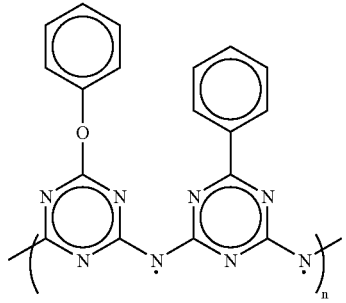

(C32)

For the secondary battery thus prepared, discharge with a constant current of 0.1 mA was conducted using the aluminum foil comprising the layer of the polymer compound having the molecular structure represented by chemical formula (C32) and the copper foil with a lithium film as a negative electrode. A plateau was found at about 2.3 V and it took 10 hours for a voltage to be reduced to 1 V or less.

Comparative Example 2

A secondary battery was prepared as described in Example 17, without using a compound having a radical on a nitrogen atom as an active material, and discharge was conducted at a constant current of 0.1 mA. A voltage was rapidly reduced to 0.8 V in about 50 min. In attempting charge by applying a constant current of 0.1 mA, a voltage was momentarily increased over 3.0 V and during re-discharge was rapidly reduced to 0.8 V in about 50 min. It indicated that the battery did not act as a secondary battery.

Example 21

On the aluminum foil comprising an organic compound layer containing TEMPO radical prepared in Example 1 were laminated the gel electrolyte film as described in Example 1 and then a copper foil having a lithium film with a lead. The whole product was sandwiched with polytetrafluoroethylene sheets with a thickness of 5 mm and was pressed to provide a secondary battery.

For the secondary battery thus prepared, charge with a constant current of 0.1 mA was conducted using the aluminum foil comprising an organic compound layer containing TEMPO radical as a positive electrode and the copper foil with a lithium film as a negative electrode. A voltage plateau was found at about 3.5 V, indicating that the battery acted as a secondary battery. A part of the compound layer containing TEMPO radical cut from the sample after discharge was subject to electron spin resonance spectroscopy as described in Example 1 to give a spin concentration of $10^{19}$ spin/g or less. It may indicate that after charge, TEMPO radical formed a bond with an electrolyte anion to consume radical. After discharging the secondary battery at a constant current of 0.1 mA, it was subject to electron spin resonance spectroscopy to give a spin concentration of $10^{21}$ spin/g or more, suggesting that in the positive electrode, discharge caused cleavage of the bond with the electrolyte anion to form a radical compound.

A secondary battery was prepared as described above for measuring voltage variation with charge/discharge. The battery exhibited a plateau in its discharge curve even after repeated charge/discharge; in other words, it also acted as a secondary battery.

As described above, a radical compound is used as a material involved in an electrode reaction according to this invention, so that there can be provided a stable secondary battery with a higher energy density and a larger capacity.

This application is based on Japanese patent applications NO. 2000-49705, NO. 2000-242806, NO. 2000-266922, NO. 2000-368475, the content of which is incorporated hereinto by reference.

What is claimed is:

1. An active material in an electrode for a secondary battery comprising a radical compound having a nitroxyl radical of the formula (A1)

(A1)

2. The active material in an electrode for a secondary battery as claimed in claim 1 wherein a spin concentration of the radical compound is $10^{21}$ spins/g or more.

3. The active material in an electrode for a secondary battery as claimed in claim 1 is used in a positive electrode in the secondary battery.

4. The active material in an electrode for a secondary battery as claimed in claim 1 wherein the radical compound forms a substituted or unsubstituted heterocycle represented by general formula (A7):

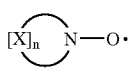

(A7)

wherein X is carbon, oxygen, nitrogen, sulfur, silicon, phosphorous or boron atom, provided that X may be the same or different; X may be bound via saturated or unsaturated bonds; X may form a bond with any substituent; this compound may be a polymer which may be straight, cyclic or branched; and n is an integer of 2 to 10 both inclusive.

5. The active material in an electrode for a secondary battery as claimed in claim 4 wherein the radical compound has a piperidinoxyl ring structure represented by general formula (A8):

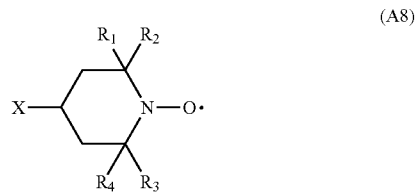

(A8)

where $R_1$ to $R_4$ are alkyl which may be substituted or unsubstituted, straight, cyclic or branched, and may contain at least one of oxygen, nitrogen, sulfur, silicon, phosphorous, boron and halogen atoms; X is a substituent containing at least one of an aliphatic group, an aromatic group, hydroxy, alkoxy, aldehyde, carboxyl, alkoxycarbonyl, cyano, amino, nitro, nitroso, halogen or hydrogen, provided that when X contains an aliphatic group, the aliphatic group may be saturated or unsaturated, substituted or unsubstituted, and straight, cyclic or branched, and may contain at least one of oxygen, nitrogen, sulfur, silicon, phosphorous, boron and halogen atoms; when X contains an aromatic group, the aromatic group may be substituted or unsubstituted and may contain at least one of oxygen, nitrogen, sulfur, silicon, phosphorous, boron and halogen atoms; when X contains hydroxy, the hydroxy may form a salt with a metal atom; when X contains alkoxy, aldehyde, carboxyl, alkoxycarbonyl, cyano, amino, nitro or nitroso, the substituent may be substituted or unsubstituted and may contain at least one of oxygen, nitrogen, sulfur, silicon, phosphorous, boron and halogen atoms; and X may form a ring.

6. The active material in an electrode for a secondary battery as claimed in claim 1 wherein the radical compound is a polymer.

* * * * *